US010551093B2

(12) United States Patent
Mizuno

(10) Patent No.: US 10,551,093 B2
(45) Date of Patent: *Feb. 4, 2020

(54) CRYOCOOLER AND ROTARY VALVE MECHANISM

(71) Applicant: SUMITOMO HEAVY INDUSTRIES, LTD., Tokyo (JP)

(72) Inventor: Yoji Mizuno, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,831

(22) Filed: Sep. 19, 2018

(65) Prior Publication Data

US 2019/0017731 A1  Jan. 17, 2019

Related U.S. Application Data

(63) Continuation-in-part of application No. 15/452,524, filed on Mar. 7, 2017, now Pat. No. 10,345,013.

(30) Foreign Application Priority Data

Mar. 16, 2016  (JP) .................................. 2016-052225

(51) Int. Cl.
  *F25B 9/14*  (2006.01)
  *F16K 31/04*  (2006.01)
  *F16K 11/074*  (2006.01)

(52) U.S. Cl.
  CPC ............ *F25B 9/145* (2013.01); *F16K 11/074* (2013.01); *F16K 31/041* (2013.01); *F25B 2309/14181* (2013.01)

(58) Field of Classification Search
  CPC ...... F25B 9/14; F25B 9/145; F25B 2309/006; F25B 2309/1418; F25B 2309/14181; F16K 25/00; F16K 25/005
  See application file for complete search history.

(56) References Cited

U.S. PATENT DOCUMENTS 3,205,668 A   9/1965  Gifford
3,625,015 A  12/1971  Chellis
(Continued)

FOREIGN PATENT DOCUMENTS

JP  S44-021906 B   9/1969
JP  H08-271075 A  10/1996
(Continued)

*Primary Examiner* — Brian M King
(74) *Attorney, Agent, or Firm* — Michael Best & Friedrich LLP

(57) ABSTRACT

A rotary valve mechanism of a cryocooler includes a valve rotor and a valve stator. A rotor recessed portion is formed such that the rotor recessed portion fluidally communicates with a stator recessed portion at a first opening degree at a second phase of a valve rotation. The valve rotor includes a first rotor communication groove and/or a second rotor communication groove formed in the valve rotor such that the rotor recessed portion fluidally communicates with the stator recessed portion at an opening degree which is smaller than the first opening degree at a first phase preceding the second phase, and/or the valve stator includes a stator communication path formed in the valve stator such that the rotor recessed portion fluidally communicates with the stator recessed portion at an opening degree which is smaller than the first opening degree at the first phase preceding the second phase.

10 Claims, 11 Drawing Sheets

(56) References Cited

U.S. PATENT DOCUMENTS

| | | | |
|---|---|---|---|
| 2002/0066276 A1* | 6/2002 | Kawano | F16K 11/074 |
| | | | 62/6 |
| 2003/0089116 A1* | 5/2003 | Heron | F16K 3/188 |
| | | | 62/6 |
| 2013/0025297 A1* | 1/2013 | Matsubara | F16K 25/005 |
| | | | 62/6 |
| 2013/0074522 A1 | 3/2013 | Xu | |
| 2014/0208774 A1 | 7/2014 | Morie et al. | |
| 2016/0061493 A1 | 3/2016 | Morie | |
| 2017/0067669 A1 | 3/2017 | Xu | |

FOREIGN PATENT DOCUMENTS

| | | |
|---|---|---|
| JP | H10-089790 A | 4/1998 |
| JP | 2006-207760 A | 8/2006 |
| JP | 2013-083433 A | 5/2013 |
| WO | WO-2011-132563 A1 | 10/2011 |

\* cited by examiner

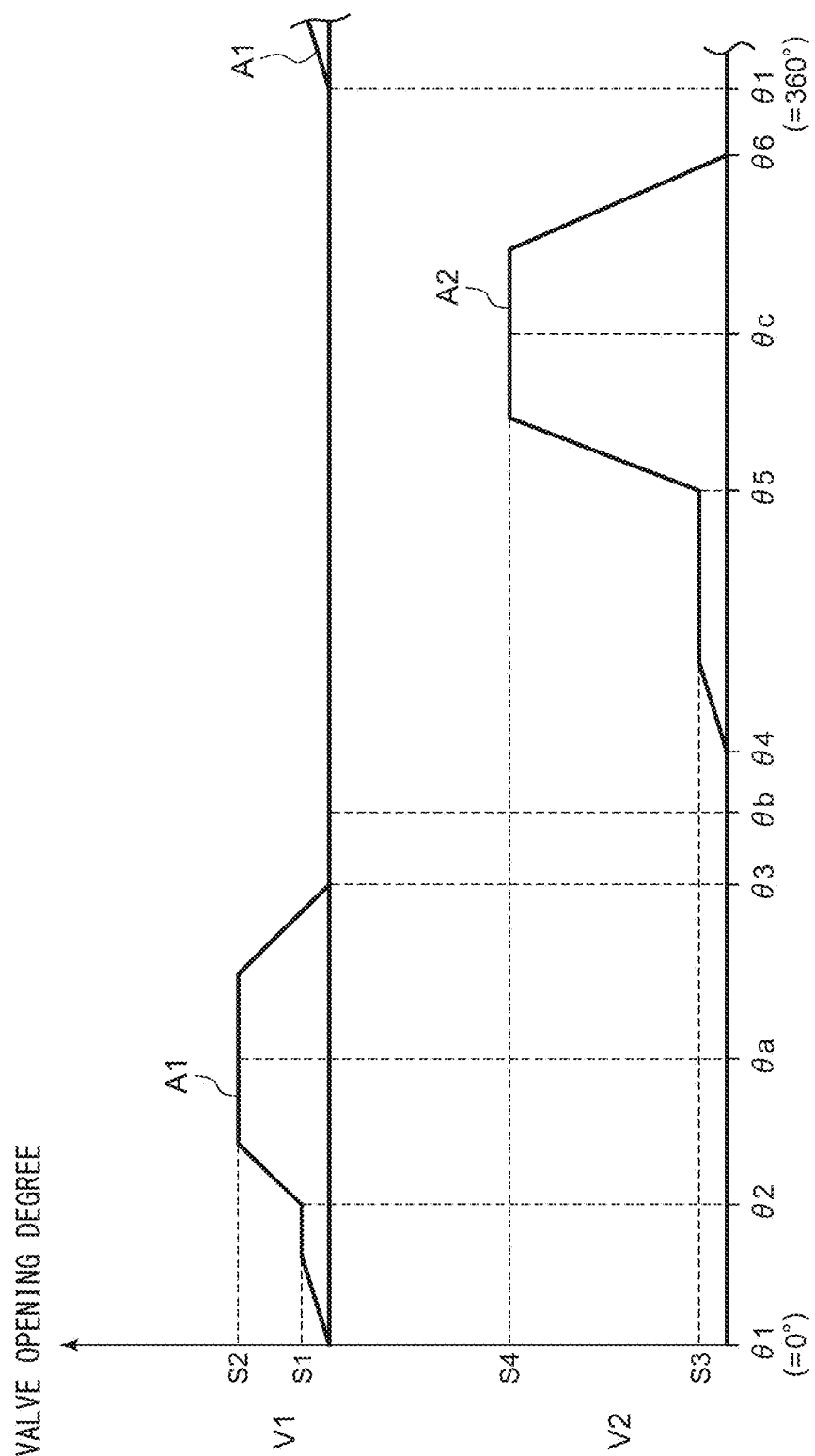

134a

134b

134b

CRYOCOOLER AND ROTARY VALVE MECHANISM

RELATED APPLICATIONS

This is a continuation-in-part of U.S. patent application Ser. No. 15/452,524 filed on Mar. 7, 2017, now pending, the contents of which, including the specification, the claims and the drawings, are incorporated herein by reference in their entirety. Priority is claimed to Japanese Patent Application No. 2016-052225, filed Mar. 16, 2016, the entire content of which is incorporated herein by reference.

BACKGROUND

Technical Field

Certain embodiments of the present invention relate to a cryocooler and a rotary valve mechanism of a cryocooler.

Description of Related Art

A cryocooler represented by a Gifford-McMahon (GM) cryocooler includes an expander and a compressor of a working gas (also referred to as refrigerant gas). In most cases, the expander includes a displacer which axially reciprocates by driving means and a regenerator which is built in the displacer. The driving means may have a motor. The displacer is accommodated in a cylinder which guides the reciprocation. A variable volume which is formed between the cylinder and the displacer generated by the relative movement of the displacer with respect to the cylinder is used as an expansion chamber of the working gas. The expander can generate coldness by appropriately synchronizing a volume change and a pressure change of the expansion chamber.

Accordingly, the cryocooler includes a valve portion for controlling the pressure of the expansion chamber. The valve portion is configured so as to alternately switch supply of a high-pressure working gas from the compressor to the expander and recovery of a low-pressure working gas from the expander to the compressor. In general, a rotary valve mechanism is used as the valve portion. The valve portion is also included in other cryocooler such as a pulse tube cryocooler.

SUMMARY

According to an aspect of the present invention, there is provided a cryocooler including: a motor; a displacer which is connected to the motor so as to reciprocate by driving of the motor; an expander airtight container in which the displacer is accommodated and a gas expansion chamber is formed between the displacer and the expander airtight container and which includes a low-pressure gas chamber which communicates with a compressor intake port; a valve stator which includes a stator plane perpendicular to a valve rotation axis, a high-pressure gas inflow port which is open to the stator plane and communicates with a compressor discharge port, and a stator recessed portion which is open to the stator plane and communicates with the gas expansion chamber, and is disposed in the low-pressure gas chamber; and a valve rotor which includes a rotor plane which is perpendicular to the valve rotation axis and is in surface-contact with the stator plane, a rotor recessed portion which is open to the rotor plane and communicates with the high-pressure gas inflow port, and a first rotor communication path which is open to the rotor plane and extends toward the rotor recessed portion, and is disposed in the low-pressure gas chamber so as to rotate around the valve rotation axis with respect to the valve stator. The rotor recessed portion is formed in the valve rotor such that the rotor recessed portion fluidally communicates with the stator recessed portion at a first opening degree at a second phase of a valve rotation and the rotor recessed portion is fluidally separated from the stator recessed portion at a third phase of the valve rotation following the second phase. The first rotor communication path is formed in the valve rotor such that the rotor recessed portion fluidally communicates with the stator recessed portion at an opening degree which is smaller than the first opening degree at a first phase of the valve rotation preceding the second phase.

According to another aspect of the present invention, there is provided a cryocooler including: a motor; a displacer which is connected to the motor so as to reciprocate by driving of the motor; an expander airtight container in which the displacer is accommodated and a gas expansion chamber is formed between the displacer and the expander airtight container and which includes a low-pressure gas chamber which communicates with a compressor intake port; a valve stator which includes a stator plane perpendicular to a valve rotation axis, a high-pressure gas inflow port which is open to the stator plane and communicates with the compressor discharge port, a stator recessed portion which is open to the stator plane and communicates with the gas expansion chamber, and a stator communication path which is open to the stator plane and extends toward the stator recessed portion, and is disposed in the low-pressure gas chamber; a valve rotor which includes a rotor plane which is perpendicular to the valve rotation axis and is in surface-contact with the stator plane and a rotor recessed portion which is open to the rotor plane and communicates with the high-pressure gas inflow port, and is disposed in the low-pressure gas chamber so as to rotate around the valve rotation axis with respect to the valve stator. The rotor recessed portion is formed in the valve rotor such that the rotor recessed portion fluidally communicates with the stator recessed portion at a first opening degree at a second phase of a valve rotation. The stator communication path is formed in the valve stator such that the rotor recessed portion fluidally communicates with the stator recessed portion at an opening degree which is smaller than the first opening degree at a first phase of the valve rotation preceding the second phase.

According to still another aspect of the present invention, there is provided a rotary valve mechanism of a cryocooler, the mechanism including: a valve stator which includes a stator plane perpendicular to a valve rotation axis and a stator recessed portion which is open to the stator plane and is a portion of a working gas flow path of a cryocooler; and a valve rotor which includes a rotor plane which is perpendicular to the valve rotation axis and is in surface-contact with the stator plane, and a rotor recessed portion which is open to the rotor plane and is a portion of the working gas flow path of the cryocooler, and is disposed so as to rotate around the valve rotation axis with respect to the valve stator. The rotor recessed portion is formed in the valve rotor such that the rotor recessed portion fluidally communicates with the stator recessed portion at a first opening degree at a second phase of a valve rotation. The valve rotor includes a rotor communication path which is formed in the valve rotor such that the rotor recessed portion fluidally communicates with the stator recessed portion at an opening degree which is smaller than the first opening degree at a first phase of the valve rotation preceding the second phase, and/or the valve stator includes a stator communication path which is formed in the valve stator such that the rotor recessed portion fluidly communicates with the stator recessed portion at an opening degree which is smaller than the first opening degree at the first phase of the valve rotation preceding the second phase.

BRIEF DESCRIPTION OF THE DRAWINGS

FIG. 4 is a view showing an operation of the cryocooler according to the embodiment of the present invention.

DETAILED DESCRIPTION

Figure 1:
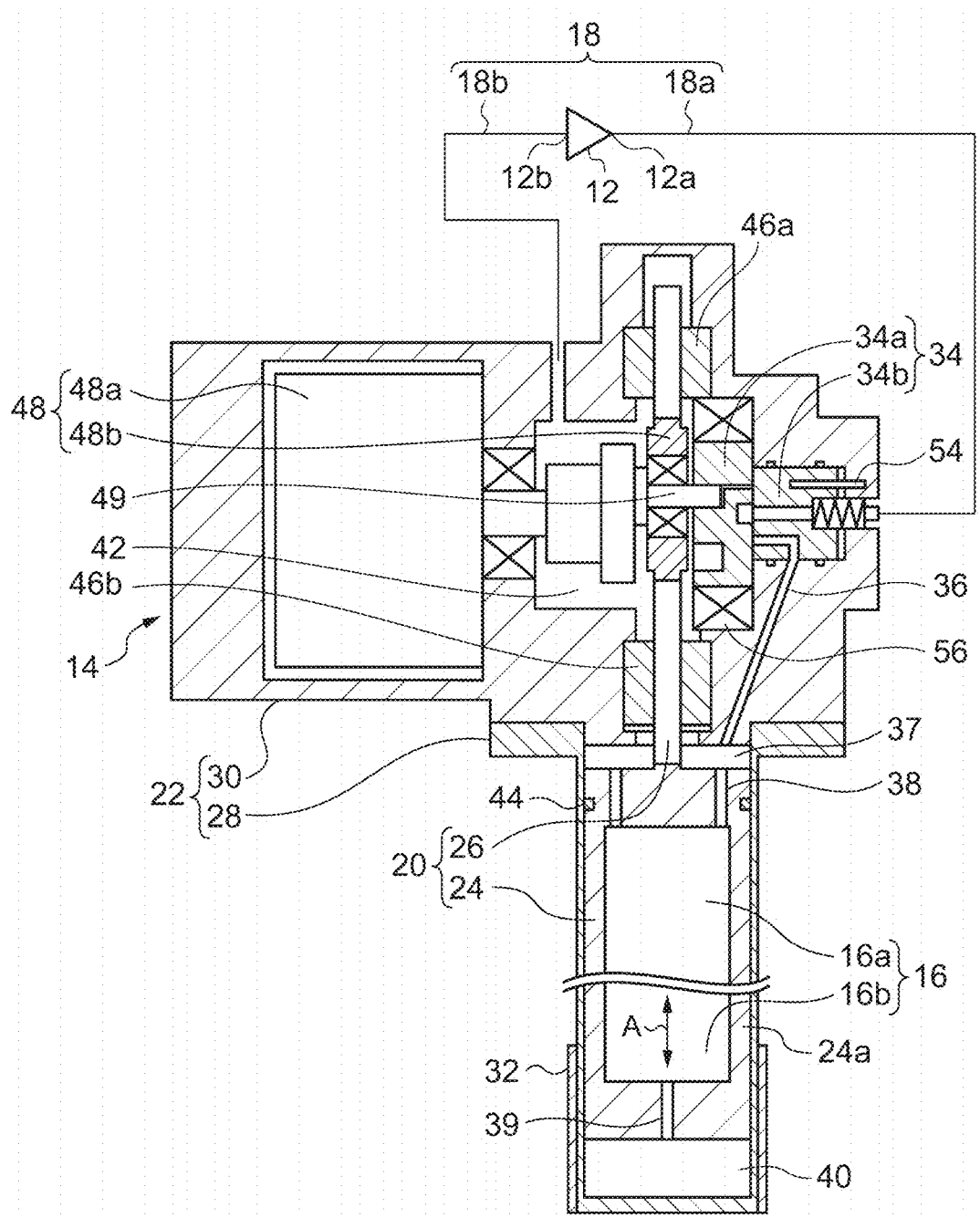
FIG. 1 is a view schematically showing the entire configuration of a cryocooler according to an embodiment of the present invention.

It is possible to increase cooling capacity of a cryocooler by increasing a size of an expansion chamber, that is, by adopting a large-sized displacer and a large-sized cylinder. In order to drive a large-sized displacer, the corresponding large-sized motor is required.

It is desirable to provide a rotary valve mechanism in which an increase in size of a drive motor of a cryocooler is prevented.

In addition, components or expression of the present invention may be replaced by each other in methods, devices, systems, or the like, and these replacements are also included in aspects of the present invention.

According to the present invention, it is possible to provide a rotary valve mechanism in which an increase in size of a drive motor of a cryocooler is prevented.

Hereinafter, embodiments of the present invention will be described in detail with reference to the drawings. In addition, in descriptions thereof, the same reference numerals are assigned to the same elements, and overlapping descriptions are appropriately omitted. Moreover, configurations described below are exemplified and do not limit the scope of the present invention.

First Embodiment

FIG. 1 is a view schematically showing a cryocooler 10 according to an embodiment of the present invention. The cryocooler 10 includes a compressor 12 which compresses a working gas and an expander 14 which cools the working gas by adiabatic expansion. For example, the working gas is helium gas. The expander 14 may be also referred to as a cold head. A regenerator 16 which pre-cools the working gas is included in the expander 14. The cryocooler 10 includes a gas pipe 18 which includes a first pipe 18a and a second pipe 18b which are respectively connected to the compressor 12 and the expander 14. The shown cryocooler 10 is a single-staged GM cryocooler.

As is well known, a working gas having a first high pressure is supplied from a discharging port 12a of the compressor 12 to the expander 14 through the first pipe 18a. The pressure of the working gas is decreased from the first high pressure to a second high pressure which is lower than the first high pressure due to adiabatic expansion in the expander 14. The working gas having the second high pressure is returned from the expander 14 to a suction port 12b of the compressor 12 through the second pipe 18b. The compressor 12 compresses the returned working gas having the second high pressure. Accordingly, the pressure of the working gas increases to the first high pressure again. In general, the first high pressure and the second high pressure are significantly higher than the atmospheric pressure. For convenience of descriptions, the first high pressure and the second high pressure are simply referred to as a high pressure and a low pressure, respectively. Typically, for example, the high pressure is 2 to 3 MPa, and the low pressure is 0.5 to 1.5 MPa. For example, a difference between the high pressure and the low pressure is approximately 1.2 to 2 MPa.

The expander 14 includes an expander movable portion 20 and an expander stationary portion 22. The expander movable portion 20 is configured so as to reciprocate in an axial direction (up-down direction in FIG. 1) with respect to the expander stationary portion 22. The movement direction of the expander movable portion 20 is indicated by an arrow A in FIG. 1. The expander stationary portion 22 is configured so as to support the expander movable portion 20 to reciprocate in the axial direction. In addition, the expander stationary portion 22 is configured of an airtight container in which the expander movable portion 20 is accommodated along with a high-pressure gas (including first high-pressure gas and second high-pressure gas).

The expander movable portion 20 includes a displacer 24 and a displacer drive shaft 26 which reciprocates the displacer 24. A regenerator 16 is built in the displacer 24. The displacer 24 includes a displacer member 24a which surrounds the regenerator 16. An internal space of the displacer member 24a is filled with a regenerator material. Accordingly, the regenerator 16 is formed inside the displacer 24. For example, the displacer 24 has a substantially columnar shape which extends in the axial direction. The displacer member 24a includes an outer diameter and an inner diameter which are substantially constant in the axial direction. Accordingly, the regenerator 16 also has a substantially columnar shape which extends in the axial direction.

The expander stationary portion 22 approximately has two configurations which includes a cylinder 28 and a drive mechanism housing 30. The upper portion of the expander stationary portion 22 in the axial direction is the drive mechanism housing 30, the lower portion of the expander stationary portion 22 in the axial direction is the cylinder 28, and the drive mechanism housing 30 and the cylinder 28 are firmly connected to each other. The cylinder 28 is configured to guide the reciprocation of the displacer 24. The cylinder 28 extends in the axial direction from the drive mechanism housing 30. The cylinder 28 has an inner diameter which is substantially constant in the axial direction. Accordingly, the cylinder 28 has a substantially cylindrical inner surface which extends in the axial direction. The inner diameter is slightly greater than the outer diameter of the displacer member 24a.

Moreover, the expander stationary portion 22 includes a cooling stage 32. The cooling stage 32 is fixed to the terminal of the cylinder 28 on the side opposite to the drive mechanism housing 30 in the axial direction. The cooling stage 32 is provided so as to transmit coldness generated by the expander 14 to other objects. The objects are attached to the cooling stage 32, and are cooled by the cooling stage 32 during the operation of the cryocooler 10.

During the operation of the cryocooler 10, the regenerator 16 includes a regenerator high-temperature portion 16a on one side (upper side in the drawing) in the axial direction, and a regenerator low-temperature portion 16b on the side (lower side in the drawing) opposite to the regenerator high-temperature portion 16a. In this way, the regenerator 16 has a temperature distribution in the axial direction. Similarly, other components (for example, displacer 24 and cylinder 28) of the expander 14 which surrounds the regenerator 16 also have axial temperature distributions. Accordingly, the expander 14 includes a high-temperature portion on one side in the axial direction and a low-temperature portion on the other side in the axial direction during the operation of the expander 14. For example, the high-temperature portion has a temperature such as an approximately room temperature. The cooling temperatures of the low-temperature portion are different from each other according to the use of the cryocooler 10, and for example, the low-temperature portion is cooled to a temperature which is included in a range from approximately 10K to approximately 100K. The cooling stage 32 is fixed to the cylinder 28 to enclose the low-temperature portion of the cylinder 28.

In the present specification, for convenience of the description, terms such as an axial direction, a radial direction, and a circumferential direction are used. As shown by an arrow A, the axial direction indicates the movement direction of the expander movable portion 20 with respect to the expander stationary portion 22. The radial direction indicates a direction (horizontal direction in the drawing) perpendicular to the axial direction, and the circumferential direction indicates a direction which surrounds the axial direction. An element of the expander 14 being close to the cooling stage 32 in the axial direction may be referred to "down", and the element being far from the cooling stage 32 in the axial direction may be referred to as "up". Accordingly, the high-temperature portion and the low-temperature portion of the expander 14 are respectively positioned on the upper portion and the lower portion in the axial direction. The expressions are used so as to only assist understanding of a relative positional relationship between elements of the expander 14. Accordingly, the expressions are not related to the disposition of the expander 14 when the expander 14 is installed in site. For example, in the expander 14, the cooling stage 32 may be installed upward and the drive mechanism housing 30 may be installed downward. Alternatively, the expander 14 may be installed such that the axial direction coincides with the horizontal direction.

In addition, terms such as the axial direction, the radial direction, and the circumferential direction are used with respect to the rotary valve mechanism. In this case, the axial direction indicates the direction of the rotary shaft of the rotary valve mechanism. The direction of the rotary valve rotation axis is orthogonal to the axial direction of the expander.

The configuration of the flow path of the working gas in the expander 14 is described. The expander 14 includes a valve portion 34, a housing gas flow path 36, an upper gas chamber 37, a displacer upper-lid gas flow path 38, a displacer lower-lid gas flow path 39, a gas expansion chamber 40, and a low-pressure gas chamber 42. A high-pressure gas flows from the first pipe 18a to the gas expansion chamber 40 via the valve portion 34, the housing gas flow path 36, the upper gas chamber 37, the displacer upper-lid gas flow path 38, the regenerator 16, and the displacer lower-lid gas flow path 39. The gas returned to the gas expansion chamber 40 flows to the low-pressure gas chamber 42 via the displacer lower-lid gas flow path 39, the regenerator 16, the displacer upper-lid gas flow path 38, the upper gas chamber 37, the housing gas flow path 36, and the valve portion 34.

Although it is described below in detail, the valve portion 34 is configured to control the pressure of the gas expansion chamber 40 to be synchronized with the reciprocation of the displacer 24. The valve portion 34 functions as a portion of a supply path for supplying a high-pressure gas to the gas expansion chamber 40, and function as a portion of a discharging path for discharging a low-pressure gas from the gas expansion chamber 40. The valve portion 34 is configured to end the discharging of the low-pressure gas and to start the supply of the high-pressure gas when the displacer 24 passes a bottom dead center or the vicinity thereof. The valve portion 34 is configured to end the supply of the high-pressure gas and to start the discharging of the low-pressure gas when the displacer 24 passes a top dead center or the vicinity thereof. In this way, the valve portion 34 is configured to switch the supply function and the discharging function of the working gas to be synchronized with the reciprocation of the displacer 24.

The housing gas flow path 36 is formed so as to penetrate the drive mechanism housing 30 such that gas flows between the expander stationary portion 22 and the upper gas chamber 37.

The upper gas chamber 37 is formed between the expander stationary portion 22 and the displacer 24 on the regenerator high-temperature portion 16a side. More specifically, the upper gas chamber 37 is interposed between the drive mechanism housing 30 and the displacer 24 in the axial direction, and is surrounded by the cylinder 28 in the circumferential direction. The upper gas chamber 37 is adjacent to the low-pressure gas chamber 42. The upper gas chamber 37 is also referred to as a room temperature chamber. The upper gas chamber 37 is a variable volume which is formed between the expander movable portion 20 and the expander stationary portion 22.

The displacer upper-lid gas flow path 38 is at least one opening of the displacer member 24a which is formed to allow the regenerator high-temperature portion 16a to communicate with the upper gas chamber 37. The displacer lower-lid gas flow path 39 is at least one opening of the displacer member 24a which is formed to allow the regenerator low-temperature portion 16b to communicate with the gas expansion chamber 40. A seal portion 44 which seals a clearance between the displacer 24 and the cylinder 28 is provided on the side surface of the displacer member 24a. The seal portion 44 may be attached to the displacer member 24a so as to surround the displacer upper-lid gas flow path 38 in the circumferential direction.

The gas expansion chamber 40 is formed between the cylinder 28 and the displacer 24 on the regenerator low-temperature portion 16b side. Similarly to the upper gas chamber 37, the gas expansion chamber 40 is a variable volume which is formed between the expander movable portion 20 and the expander stationary portion 22, and the volume of the gas expansion chamber 40 is complementarily changed with the volume of the upper gas chamber 37 by the relative movement of the displacer 24 with respect to the cylinder 28. Since the seal portion 44 is provided, a direct gas flow (that is, the flow of gas which bypasses the regenerator 16) between the upper gas chamber 37 and the gas expansion chamber 40 is not generated.

The low-pressure gas chamber 42 defines the inside of the drive mechanism housing 30. The second pipe 18b is connected to the drive mechanism housing 30. Accordingly, the low-pressure gas chamber 42 communicates with the suction port 12b of the compressor 12 through the second pipe 18b. Therefore, the low-pressure gas chamber 42 is always maintained to a low pressure.

The displacer drive shaft 26 protrudes from the displacer 24 to the low-pressure gas chamber 42 through the upper gas chamber 37. The expander stationary portion 22 includes a pair of drive shaft guides 46a and 46b which support the displacer drive shaft 26 in the axial direction in a movable manner. Each of the drive shaft guides 46a and 46b is provided in the drive mechanism housing 30 so as to surround the displacer drive shaft 26. The drive shaft guide 46b positioned on the lower side in the axial direction or the lower end section of the drive mechanism housing 30 is airtightly configured. Accordingly, the low-pressure gas chamber 42 is separated from the upper gas chamber 37. The direct gas flow between the low-pressure gas chamber 42 and the upper gas chamber 37 is not generated.

The expander 14 includes a drive mechanism 48 which drives the displacer 24. The drive mechanism 48 is accommodated in the low-pressure gas chamber 42, and includes a motor 48a and a scotch yoke mechanism 48b. The displacer drive shaft 26 forms a portion of the scotch yoke mechanism 48b. In addition, the scotch yoke mechanism 48b includes a crank pin 49 which extends to be parallel to the output shaft of the motor 48a and is eccentric to the output shaft. The displacer drive shaft 26 is connected to the scotch yoke mechanism 48b to be driven in the axial direction by the scotch yoke mechanism 48b. Accordingly, the displacer 24 reciprocates in the axial direction by the rotation of the motor 48a. The scotch yoke mechanism 48b is interposed between the drive shaft guides 46a and 46b, and the drive shaft guides 46a and 46b are positioned at different positions from each other in the axial direction.

The valve portion 34 is connected to the drive mechanism 48 and is accommodated in the drive mechanism housing 30. The valve portion 34 is a rotary valve type. The valve portion 34 includes a rotor valve resin member (hereinafter, may be simply referred to as a valve rotor) 34a and a stator valve metal member (hereinafter, may be simply referred to as a valve stator) 34b. That is, the valve rotor 34a is formed of a resin material (for example, engineering plastic material or fluororesin material), and the valve stator 34b is formed of metal (for example, aluminum material or steel material). Conversely, the valve rotor 34a may be formed of metal and the valve stator 34b is formed of a resin. The valve rotor 34a and the valve stator 34b may be respectively referred to as a valve disk and a valve body.

The valve rotor 34a and the valve stator 34b are disposed in the low-pressure gas chamber 42. The valve rotor 34a is connected to the output shaft of the motor 48a so as to be rotated by the rotation of the motor 48a. The valve rotor 34a is in surface-contact with the valve stator 34b so as to rotationally slide on the valve stator 34b. The valve stator 34b is fixed to the drive mechanism housing 30. The valve stator 34b is configured so as to receive the high-pressure gas which enters the drive mechanism housing 30 from the first pipe 18a.

Figure 2:
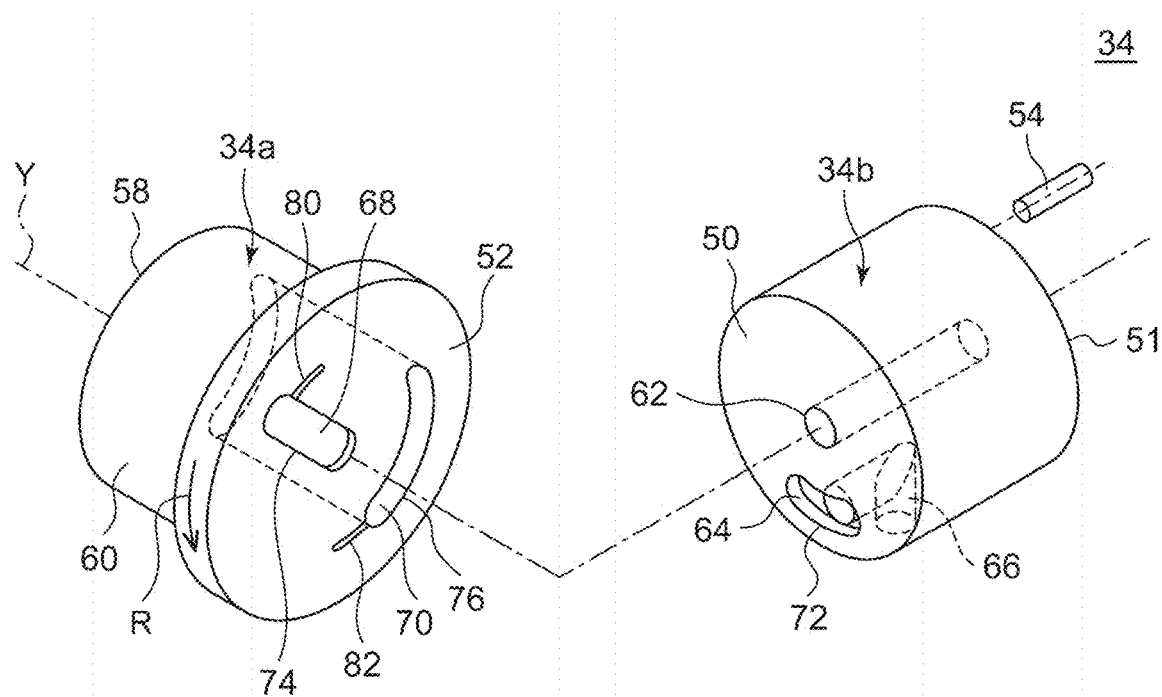
FIG. 2 is an exploded perspective view schematically showing a valve portion according to the embodiment of the present invention.
Figure 3A:
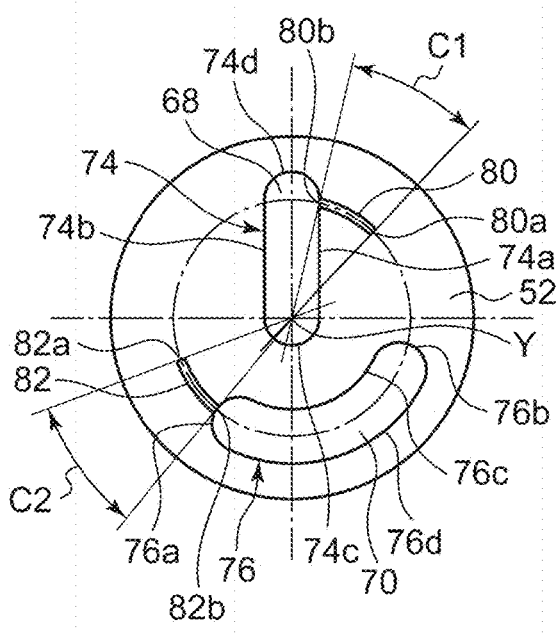
FIGS. 3A and 3B are plan views schematically showing a valve rotor and a valve stator according to the embodiment of the present invention.
Figure 3B:
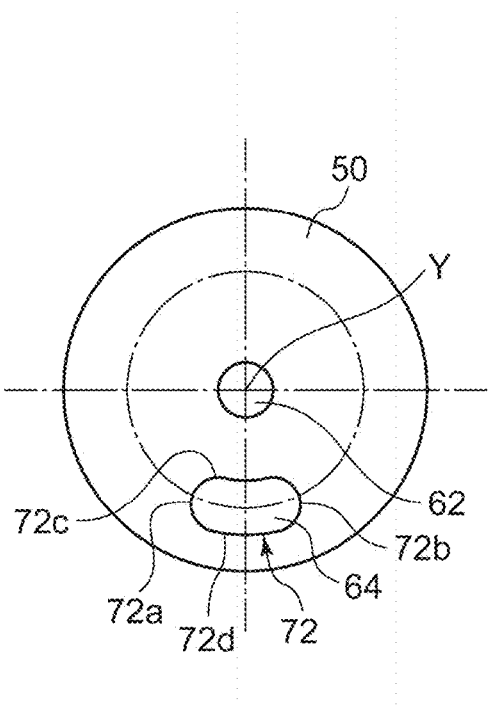

FIG. 2 is an exploded perspective view schematically showing the main portion of the valve portion 34 according to the embodiment of the present invention. A dashed line shown in FIG. 2 indicates a valve rotation axis Y. FIGS. 3A and 3B are plan views schematically showing the valve rotor 34a and the valve stator 34b according to the embodiment of the present invention. For easy understanding, the dashed lines of FIGS. 3A and 3B indicate the same position.

The valve stator 34b includes a stator plane 50 which is perpendicular to the valve rotation axis Y, and similarly, the valve rotor 34a includes a rotor plane 52 which is perpendicular to the valve rotation axis Y. When the valve rotor 34a rotates with respect to the valve stator 34b, the rotor plane 52 rotationally slides on the stator plane 50. Since the stator plane 50 and the rotor plane 52 are in surface-contact with each other, leakage of a refrigerant gas is prevented.

The valve stator 34b is fixed to the inside of the drive mechanism housing 30 by a valve stator fixing pin 54. The valve stator fixing pin 54 engages with a valve stator end surface 51 which is positioned on the side opposite to the stator plane 50 of the valve stator 34b in the rotation axis direction, and regulates the rotation of the valve stator 34b.

The valve rotor 34a is rotatably supported by a rotor bearing 56 shown in FIG. 1. An engagement hole (not shown) which engages with the crank pin 49 is formed on a valve rotor end surface 58 which is positioned on the rotor plane 52 of the valve rotor 34a in the rotation axis direction. The motor 48a rotates the crank pin 49, and thereby, the valve rotor 34a rotates so as to be synchronized with the scotch yoke mechanism 48b. Moreover, the valve rotor 34a includes a rotor outer peripheral surface 60 which connects the rotor plane 52 to the valve rotor end surface 58. The rotor outer peripheral surface 60 is supported by the rotor bearing 56 and faces the low-pressure gas chamber 42.

The valve stator 34b includes a high-pressure gas inflow port 62 and a stator recessed portion 64. The high-pressure gas inflow port 62 is open to the center portion of the stator plane 50, and is formed to penetrate the center portion of the valve stator 34b in the rotation axis direction. The high-pressure gas inflow port 62 defines a cylindrical outline which has the valve rotation axis Y as a center on the stator plane 50. The high-pressure gas inflow port 62 communicates with the discharging port 12a of the compressor 12 through the first pipe 18a. The stator recessed portion 64 is open outside the high-pressure gas inflow port 62 in the radial direction on the stator plane 50. The stator recessed portion 64 is formed in an arc shape with the high-pressure gas inflow port 62 as a center. The depth of the stator recessed portion 64 is shorter than the length of the valve stator 34b in the rotation axis direction, and the stator recessed portion 64 does not penetrate the valve stator 34b.

The valve stator 34b includes a communication path 66 which is formed so as to penetrate the valve stator 34b to connect the stator recessed portion 64 to the housing gas flow path 36. Accordingly, the stator recessed portion 64 finally communicates with the gas expansion chamber 40 via the communication path 66 and the housing gas flow path 36. One end of the communication path 66 is open to the stator recessed portion 64 and the other end thereof is open to the side surface of the valve stator 34b. While the portion of the communication path 66 on the stator recessed portion 64 side extends in the rotation axis direction, the portion of the communication path 66 on the housing gas flow path 36 side extends in the radial direction so as to be orthogonal to the rotation axis direction.

The stator recessed portion 64 defines an arc-shaped stator recessed portion outline 72 on the stator plane 50. The stator recessed portion outline 72 includes a stator recessed portion front edge line 72a, a stator recessed portion rear edge line 72b, a stator recessed portion inner edge line 72c, and a stator recessed portion outer edge line 72d. The stator recessed portion front edge line 72a and the stator recessed portion rear edge line 72b are positioned so as to be separated from each other in the valve peripheral direction, and the stator recessed portion inner edge line 72c and the stator recessed portion outer edge line 72d are positioned so as to be separated from each other in the valve radial direction. The stator recessed portion inner edge line 72c connects one end of the stator recessed portion front edge line 72a to one end of the stator recessed portion rear edge line 72b, and the stator recessed portion outer edge line 72d connects the other end of the stator recessed portion front edge line 72a to the other end of the stator recessed portion rear edge line 72b.

The stator recessed portion front edge line 72a and the stator recessed portion rear edge line 72b are semicircular lines in directions opposite to each other. The stator recessed portion inner edge line 72c and the stator recessed portion outer edge line 72d are circular arcs which have the valve rotation axis Y as centers and the same center angle as each other. The stator recessed portion inner edge line 72c is positioned inside the stator recessed portion outer edge line 72d in the radial direction. That is, the radius of the stator recessed portion inner edge line 72c is smaller than the radius of the stator recessed portion outer edge line 72d. In addition, the radius of the stator recessed portion inner edge line 72c is larger than the radius of the circular outline of the high-pressure gas inflow port 62.

The valve rotor 34a includes a rotor recessed portion 68 and a low-pressure gas outflow port 70 which is a second rotor recessed portion. The rotor plane 52 is in surface-contact with the stator plane 50 around the rotor recessed portion 68. Similarly, the rotor plane 52 is in surface-contact with the stator plane 50 around the low-pressure gas outflow port 70.

The rotor recessed portion 68 is open to the rotor plane 52 and is formed in an elliptical shape. The rotor recessed portion 68 extends from the center portion of the rotor plane 52 toward the outside in the radial direction. The depth of the rotor recessed portion 68 is shorter than the length of the valve rotor 34a in the rotation axis direction, and the rotor recessed portion 68 does not penetrate the valve rotor 34a. The rotor recessed portion 68 is positioned at the location corresponding to the high-pressure gas inflow port 62 on the rotor plane 52, and the rotor recessed portion 68 communicates with high-pressure gas inflow port 62 at all times.

The rotor recessed portion 68 defines a rotor recessed portion outline 74 on the rotor plane 52. The rotor recessed portion outline 74 includes a rotor recessed portion front edge line 74a, a rotor recessed portion rear edge line 74b, a rotor recessed portion inner edge line 74c, and a rotor recessed portion outer edge line 74d. The rotor recessed portion front edge line 74a and the rotor recessed portion rear edge line 74b are positioned so as to be separated from each other in the valve peripheral direction, and the rotor recessed portion inner edge line 74c and the rotor recessed portion outer edge line 74d are positioned so as to be separated from each other in the valve radial direction. The rotor recessed portion inner edge line 74c connects one end of the rotor recessed portion front edge line 74a to one end of the rotor recessed portion rear edge line 74b, and the rotor recessed portion outer edge line 74d connects the other end of the rotor recessed portion front edge line 74a to the other end of the rotor recessed portion rear edge line 74b.

Each of the rotor recessed portion front edge line 74a and the rotor recessed portion rear edge line 74b is linear. The rotor recessed portion inner edge line 74c and the rotor recessed portion outer edge line 74d are semicircular lines in directions opposite to each other. The radius of the rotor recessed portion inner edge line 74c is the same as the radius of the circular outline of the high-pressure gas inflow port 62, and the rotor recessed portion inner edge line 74c and the high-pressure gas inflow port 62 overlap each other.

The rotor recessed portion 68 is formed in the valve rotor 34a so as to allow the high-pressure gas inflow port 62 to communicate with the stator recessed portion 64 in a portion (for example, an intake process) of one period of the rotation of the valve rotor 34a, and allow the high-pressure gas inflow port 62 not to communicate with the stator recessed portion 64 in a remaining portion (for example, exhaust process) of the one period. Two regions configured of the rotor recessed portion 68 and the high-pressure gas inflow port 62, or three regions configured of the rotor recessed portion 68, the high-pressure gas inflow port 62, and the stator recessed portion 64 form high-pressure regions (or high-pressure flow paths) which communicates with each other in the valve portion 34. The valve rotor 34a seals the high-pressure region and is disposed to be adjacent to the valve stator 34b so as to separate the high-pressure region from the low-pressure surrounding environment (that is, low-pressure gas chamber 42). The rotor recessed portion 68 is provided as a flow direction changing portion or a flow path folding portion in the high-pressure flow path of the valve portion 34. In this way, an intake valve V1 (refer to FIG. 4) which defines an intake process A1 is configured in the valve portion 34.

In addition, the valve rotor 34a includes a first rotor communication groove 80 which is open to the rotor plane 52 and extends toward the rotor recessed portion 68. The first rotor communication groove 80 is formed on the rotor plane 52, and is slenderer than the rotor recessed portion 68. The first rotor communication groove 80 extends in a circular-arc shape along a central radius (that is, an average radius between the stator recessed portion inner edge line 72c and the stator recessed portion outer edge line 72d) of the stator recessed portion 64 indicated by a dashed line in FIG. 3A. The depth of the first rotor communication groove 80 from the rotor plane 52 is smaller than the depth of the rotor recessed portion 68.

The first rotor communication groove 80 includes a first starting end 80a which is open to the rotor plane 52 and a first terminal 80b which communicates with the rotor recessed portion 68. The first terminal 80b is positioned on the rotor recessed portion front edge line 74a. The first rotor communication groove 80 extends from the first starting end 80a to the first terminal 80b. An angle C1 of the first terminal 80b from the first starting end 80a is larger than 3° and less than 30°.

The low-pressure gas outflow port 70 is open to the rotor plane 52 on the side opposite to the rotor recessed portion 68 in the radial direction, and is formed so as to penetrate the valve rotor 34a in the rotation axis direction. The low-pressure gas outflow port 70 penetrates from the rotor plane 52 of the valve rotor 34a to the valve rotor end surface 58. The low-pressure gas outflow port 70 forms a low-pressure flow path which communicates with the low-pressure gas chamber 42.

The low-pressure gas outflow port 70 defines an arc-shaped outflow port outline 76 on the rotor plane 52. The outflow port outline 76 includes an outflow port front edge line 76a, an outflow port rear edge line 76b, an outflow port inner edge line 76c, and an outflow port outer edge line 76d. The outflow port front edge line 76a and the outflow port rear edge line 76b are positioned so as to be separated from each other in a valve rotation direction, and the outflow port inner edge line 76c and the outflow port outer edge line 76d are positioned so as to be separated from each other in the valve radial direction. The outflow port inner edge line 76c connects one end of the outflow port front edge line 76a to one end of the outflow port rear edge line 76b, and the outflow port outer edge line 76d connects the other end of the outflow port front edge line 76a to the outer end of the outflow port rear edge line 76b. The low-pressure gas outflow port 70 is formed to be longer than the stator recessed portion 64 in the valve peripheral direction.

The outflow port front edge line 76a and the outflow port rear edge line 76b respectively are semicircular lines in directions opposite to each other. The outflow port inner edge line 76c and the outflow port outer edge line 76d are arcs which have the valve rotation axis Y as a center, and have the same center angle as each other. The outflow port inner edge line 76c is positioned inside the outflow port outer edge line 76d in the radial direction. That is, the radius of the outflow port inner edge line 76c is smaller than the radius of the outflow port outer edge line 76d. The radius of the outflow port inner edge line 76c is the same as the radius of the stator recessed portion inner edge line 72c, and the radius of the outflow port outer edge line 76d is the same as the radius of the stator recessed portion outer edge line 72d.

The low-pressure gas outflow port 70 is formed in the valve rotor 34a so as to allow the stator recessed portion 64 to communicate with the low-pressure gas chamber 42 in at least a portion (for example, exhaust process) of the period in which the high-pressure gas inflow port 62 does not communicate with the stator recessed portion 64. Accordingly, an exhaust valve V2 (refer to FIG. 4) which defines an exhaust process A2 is formed in the valve portion 34.

In addition, the valve rotor 34a includes a second rotor communication groove 82 which is open to the rotor plane 52 and extends toward the low-pressure gas outflow port 70. The second rotor communication groove 82 is formed on the rotor plane 52, and is slenderer than the low-pressure gas outflow port 70. The second rotor communication groove 82 extends in a circular-arc shape along the central radius (that is, the average radius between the stator recessed portion inner edge line 72c and the stator recessed portion outer edge line 72d) of the stator recessed portion 64 indicated by a dashed line in FIG. 3A. Accordingly, the second rotor communication groove 82 is positioned on the same circumference as that of the first rotor communication groove 80. The depth of the second rotor communication groove 82 from the rotor plane 52 is smaller than the depth of the low-pressure gas outflow port 70. The depth of the second rotor communication groove 82 may be the same as the depth of the first rotor communication groove 80.

The second rotor communication groove 82 includes a second starting end 82a which is open to the rotor plane 52 and a second terminal 82b which communicates with the low-pressure gas outflow port 70. The second terminal 82b is positioned on the outflow port front edge line 76a. The second rotor communication groove 82 extends from the second starting end 82a to the second terminal 82b. An angle C2 of the second terminal 82b from the second starting end 82a is larger than 3° and less than 30°. In the shown example, the angle C2 is the same as the angle C1. However, the angle C2 may be different from the angle C1.

Figure 5:
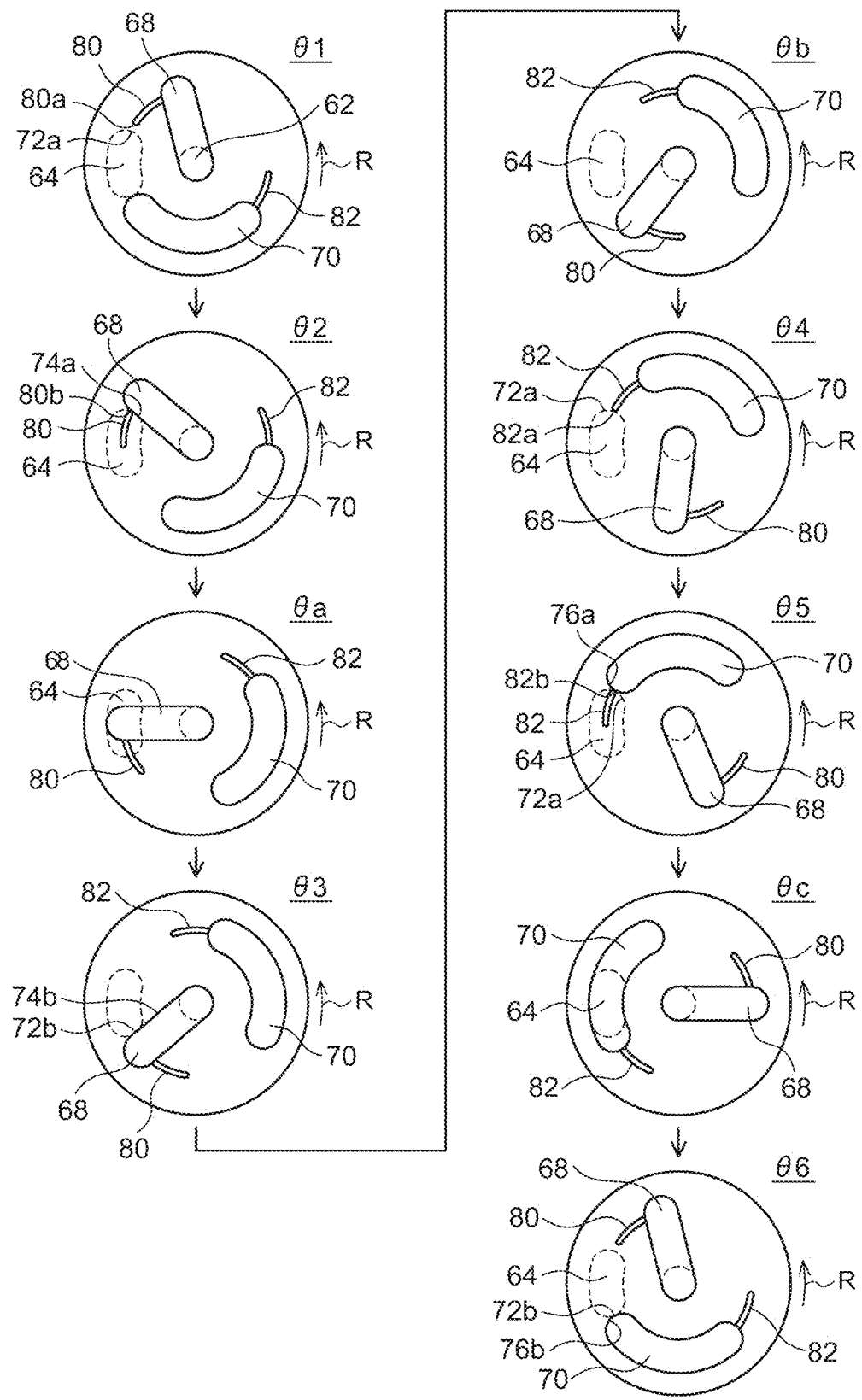
FIG. 5 is a view showing an operation of the valve portion according to the embodiment of the present invention.

The operation of the cryocooler 10 having the above-described configuration will be described. FIG. 4 is a view showing the operation of the cryocooler 10 according to the embodiment of the present invention. FIG. 5 is a view showing the operation of the valve portion 34 according to the embodiment of the present invention.

A horizontal axis in FIG. 4 indicates a phase in the rotation of the valve portion 34. One period (the reciprocation of the displacer 24 in the axial direction may be one period) in the rotation of the valve portion 34 corresponds to 360°. 0° corresponds to a starting time point of the period and 360° corresponds to an end time point of the period. A vertical axis in FIG. 4 indicates an opening degree of the valve portion 34. Here, the opening degree of the valve portion 34 corresponds to an overlapping area between the valve rotor 34a side recessed portion and the valve stator 34b side recessed portion.

The intake process A1 and the exhaust process A2 of the cryocooler 10 are shown in FIG. 4. The intake process A1 is a range from first phase θ1 of the valve rotation to a third phase θ3 and the exhaust process A2 is a range from a fourth phase θ4 of the valve rotation to a sixth phase θ6. The intake process A1 and the exhaust process A2 alternate with each other. The intake process A1 ends before the exhaust process A2 starts and the exhaust process A2 ends before the intake process A1 such that the intake process A2 and the exhaust process A1 do not overlap each other.

A portion from the first phase θ1 to the second phase θ2 corresponds to a preceding portion of the intake process A1 and a portion from the second phase θ2 to the third phase θ3 corresponds to a main body portion of the intake process A1. A portion from the fourth phase θ4 to the fifth phase θ5 corresponds to a preceding portion of the exhaust process A2 and a portion from the fifth phase θ5 to the sixth phase θ6 corresponds to a main body portion of the exhaust process A2.

FIG. 5 shows an aspect when the valve portion 34 is projected from the valve rotor 34a side and shows relative positions among the high-pressure gas inflow port 62, the stator recessed portion 64, the rotor recessed portion 68, and the low-pressure gas outflow port 70. The valve rotor 34a rotates in the valve rotation direction R (counterclockwise direction in the drawings) with respect to the valve stator 34b. The high-pressure gas inflow port 62 and the stator recessed portion 64 of the valve stator 34b are shown by solid lines, and the rotor recessed portion 68 and the low-pressure gas outflow port 70 of the valve rotor 34a are shown by broken lines.

The first starting end 80a of the first rotor communication groove 80 is positioned on the rotor plane 52 so as to pass through the stator recessed portion front edge line 72a at the first phase θ1. The rotor recessed portion 68 fluidally communicates with the stator recessed portion 64 through the first rotor communication groove 80 at the first phase θ1. In this way, the intake valve V1 is open at the first phase θ1 and the intake process A1 starts. After the first phase θ1, the intake valve V1 is open at a predetermined minute opening degree S1.

As described above, the angle C1 from the first starting end 80a to the first terminal 80b corresponds to the phase difference between the first phase θ1 and the second phase θ2. Accordingly, the phase difference between the first phase θ1 and the second phase θ2 is larger than 3° and less than 30°. If the groove length of the first rotor communication groove 80 is within this range, a significant decrease in cooling capacity does not occur.

The first terminal 80b of the first rotor communication groove 80 is positioned on the rotor plane 52 so as to pass through the stator recessed portion front edge line 72a at the second phase θ2. The second phase θ2 follows the first phase θ1. The rotor recessed portion front edge line 74a passes through the stator recessed portion front edge line 72a at the second phase θ2. After the second phase θ2, the opening degree of the intake valve V1 increase and reaches the maximum opening degree S2. As shown in a phase θa between the second phase θ2 and the third phase θ3 with reference to FIGS. 4 and 5, the intake valve V1 is open at the maximum opening degree S2.

At the third phase θ3, the rotor recessed portion rear edge line 74b passes through the stator recessed portion rear edge line 72b, and the rotor recessed portion 68 is fluidally separated from the stator recessed portion 64. In this way, the intake valve V1 is closed and the intake process A1 ends at the third phase θ3. During the intake process A1, the low-pressure gas outflow port 70 is fluidally separated from the stator recessed portion 64.

As shown in a phase θb between the third phase θ3 and the fourth phase θ4 with reference to FIGS. 4 and 5, the intake valve V1 and the exhaust valve V2 are open between the intake process A1 and the exhaust process A2.

The second starting end 82a of the second rotor communication groove 82 is positioned on the rotor plane 52 so as to pass through the stator recessed portion front edge line 72a at the fourth phase θ4. The low-pressure gas outflow port 70 fluidally communicates with the stator recessed portion 64 through the second rotor communication groove 82 at the fourth phase θ4. In this way, the exhaust valve V2 is open and the exhaust process A2 starts at the fourth phase θ4. After the fourth phase θ4, the exhaust valve V2 is open at a predetermined minute opening degree S3. The opening degree S3 is the same as the opening degree S1.

As described above, the angle C2 from the second starting end 82a to the second terminal 82b corresponds to the phase difference between the fourth phase θ4 and the fifth phase θ5. Accordingly, the phase difference between the fourth phase θ4 and the fifth phase θ5 is larger than 3° and less than 30°.

The second terminal 82b of the second rotor communication groove 82 is positioned on the rotor plane 52 so as to pass through the stator recessed portion front edge line 72a at the fifth phase θ5. The fifth phase θ5 follows the fourth phase θ4. The outflow port front edge line 76a passes through the stator recessed portion front edge line 72a at the fifth phase θ5. After the fifth phase θ5, the opening degree of the exhaust valve V2 increase and reaches the maximum opening degree S4. As shown in a phase θc between the fifth phase θ5 and the sixth phase θ6 with reference to FIGS. 4 and 5, the exhaust valve V2 is open at the maximum opening degree S4. In the shown example, the maximum opening degree S4 of the exhaust valve V2 is larger than the maximum opening degree S2 of the intake valve V1.

At the sixth phase θ6, the outflow port rear edge line 76b passes through the stator recessed portion rear edge line 72b, and the low-pressure gas outflow port 70 is fluidally separated from the stator recessed portion 64. In this way, the exhaust valve V2 is closed and the exhaust process A2 ends at the sixth phase θ6. During the exhaust process A2, the rotor recessed portion 68 is fluidally separated from the stator recessed portion 64. The intake valve V1 and the exhaust valve V2 are closed between the sixth phase θ6 and the first phase θ1.

In this way, the rotor recessed portion 68 is formed in the valve rotor 34a such that the rotor recessed portion 68 fluidally communicates with the stator recessed portion 64 at a first opening degree at the second phase θ2 of the valve rotation and the rotor recessed portion 68 is fluidally separated from the stator recessed portion 64 at the third phase θ3 of the valve rotation following the second phase θ2. The first rotor communication groove 80 is formed in the valve rotor 34a such that the rotor recessed portion 68 fluidally communicates with the stator recessed portion 64 at an opening degree which is smaller than the first opening degree at the first phase θ1 of the valve rotation which follows the sixth phase θ6 and precedes the second phase θ2.

In addition, the low-pressure gas outflow port 70 is formed in the valve rotor 34a such that the low-pressure gas outflow port 70 fluidally communicates with the stator recessed portion 64 at a second opening degree at the fifth phase θ5 of the valve rotation and the low-pressure gas outflow port 70 is fluidally separated from the stator recessed portion 64 at the sixth phase θ6 of the valve rotation following the fifth phase θ5. The second rotor communication groove 82 is formed in the valve rotor 34a such that the low-pressure gas outflow port 70 fluidally communicates with the stator recessed portion 64 at an opening degree which is smaller than the second opening degree at the fourth phase θ4 of the valve rotation which follows the third phase θ3 and precedes the fifth phase θ5.

The displacer 24 is positioned at the bottom dead center or in the vicinity thereof at the first phase θ1. The valve portion 34 is switched so as to connect the discharging port 12a of the compressor 12 to the gas expansion chamber 40. The intake process A1 of the cryocooler 10 starts. In the valve portion 34, a high-pressure gas flows from the high-pressure gas inflow port 62 to the stator recessed portion 64 through the rotor recessed portion 68. The high-pressure gas enters the regenerator high-temperature portion 16a through the housing gas flow path 36, the upper gas chamber 37, and the displacer upper-lid gas flow path 38 from the valve portion 34. The gas is cooled while passing through the regenerator 16, and finally, the gas enters the gas expansion chamber 40 through the displacer lower-lid gas flow path 39 from the regenerator low-temperature portion 16b. While the gas flows into the gas expansion chamber 40, the displacer 24 moves toward the top dead center of the cylinder 28. Accordingly, the volume of the gas expansion chamber 40 increases. Therefore, the gas expansion chamber 40 is filled with the high-pressure gas.

The displacer 24 is positioned at the top dead center or in the vicinity thereof at the fourth phase θ4. The valve portion 34 is switched so as to connect the suction port 12b of the compressor 12 to the gas expansion chamber 40. The exhaust process A2 starts. The high-pressure gas is expanded and cooled in the gas expansion chamber 40. The expanded gas enters the regenerator 16 through the displacer lower-lid gas flow path 39 from the gas expansion chamber 40. The gas is cooled while passing through the regenerator 16. The gas is returned to the compressor 12 via the housing gas flow path 36, the valve portion 34, and the low-pressure gas chamber 42 from the regenerator 16. In the valve portion 34, the low-pressure gas returned from the gas expansion chamber 40 flows from the stator recessed portion 64 to the low-pressure gas chamber 42 through the low-pressure gas outflow port 70. While the gas flows out from the gas expansion chamber 40, the displacer 24 moves toward the bottom dead center of the cylinder 28. Accordingly, the volume of the gas expansion chamber 40 is decreased, and a low-pressure gas is discharged from the gas expansion chamber 40. If the exhaust process A2 ends, the intake process A1 starts again.

The above-described process is one-time cooling cycle in the cryocooler 10. The cryocooler 10 repeats the cooling cycle and cools the cooling stage 32 to a desired temperature. Accordingly, the cryocooler 10 can cool an object which is thermally connected to the cooling stage 32 to a cryogenic temperature.

Figure 6:
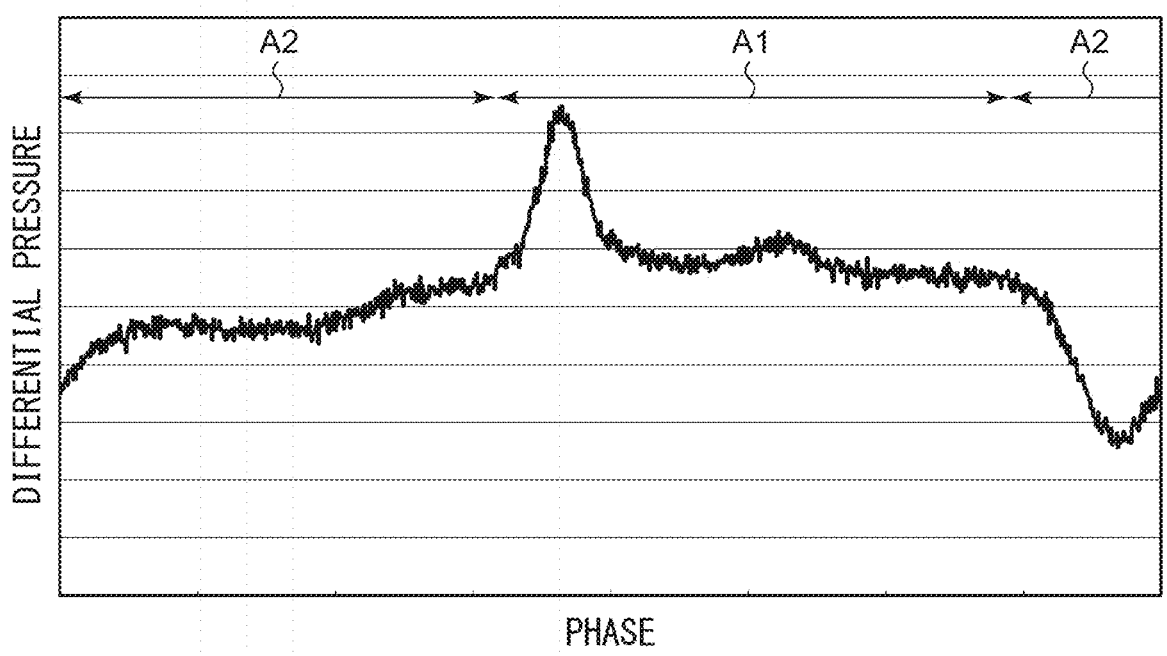
FIG. 6 is an example of a differential pressure variation measurement result during one period of a typical GM cryocooler.

FIG. 6 is an example of a differential pressure variation measurement result during one period of a typical GM cryocooler. A measurement differential pressure between the upper gas chamber and the gas expansion chamber is shown. It is understood that the peaks of the differential pressure are generated twice immediately after the intake process A1 starts and immediately after the exhaust process A2 starts. Any peak is generated when the rotary valve is open.

According to the present embodiment, the first rotor communication groove 80 is provided in the rotor recessed portion 68, and the second rotor communication groove 82 is provided in the low-pressure gas outflow port 70. A thin groove preceded in the valve rotation direction is added to the valve hole. Since the intake valve V1 and the exhaust valve V2 are gradually open, an abrupt change of pressure in the cylinder 28 is prevented, and the differential pressure peak is reduced. Since the differential pressure peak determines the maximum value of load torque applied to the motor 48a which drives the displacer 24, the maximum value of the load torque is decreased. The maximum value of the load torque largely influences design with respect to the capability and size of the adopted motor 48a. Accordingly, it is possible to adopt the motor 48a having a smaller size. The first rotor communication groove 80 and the second rotor communication groove 82 prevent an increase in size of the motor 48a.

According to FIG. 6, the differential pressure peak of the intake process A1 is larger than the differential pressure peak of the exhaust process A2. Therefore, preferably, a communication groove is provided in at least the intake valve V1 (that is, the rotor recessed portion 68). However, if necessary, a communication groove may be provided in only the exhaust valve V2 (that is, the low-pressure gas outflow port 70).

Figure 7:
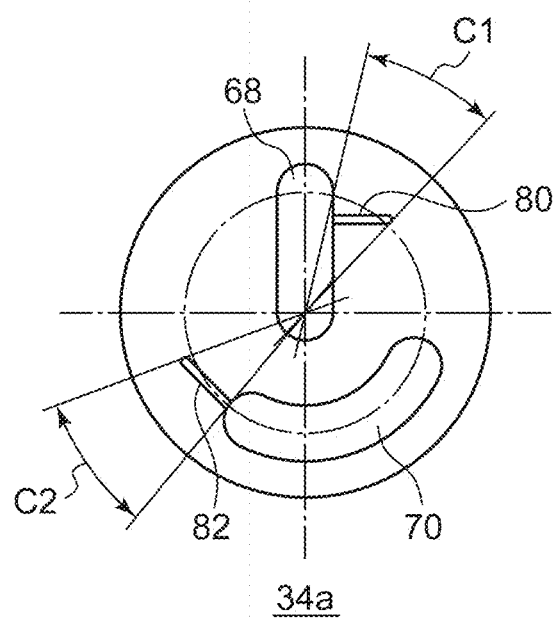
FIG. 7 is a plan view schematically showing a valve rotor according to another embodiment.

FIG. 7 is a plan view schematically showing a valve rotor 34a according to another embodiment. As shown in FIG. 7, the first rotor communication groove 80 and the second rotor communication groove 82 may be linear.

Figure 8A:
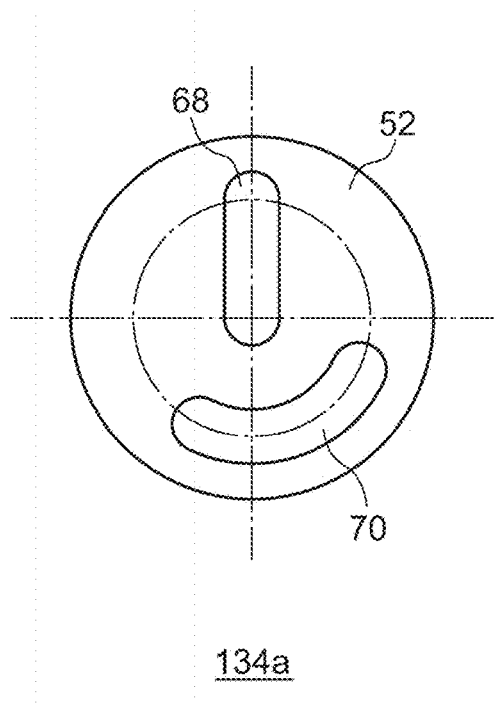
FIGS. 8A and 8B are plan views schematically showing the valve rotor and a valve stator according to still another embodiment.
Figure 8B:
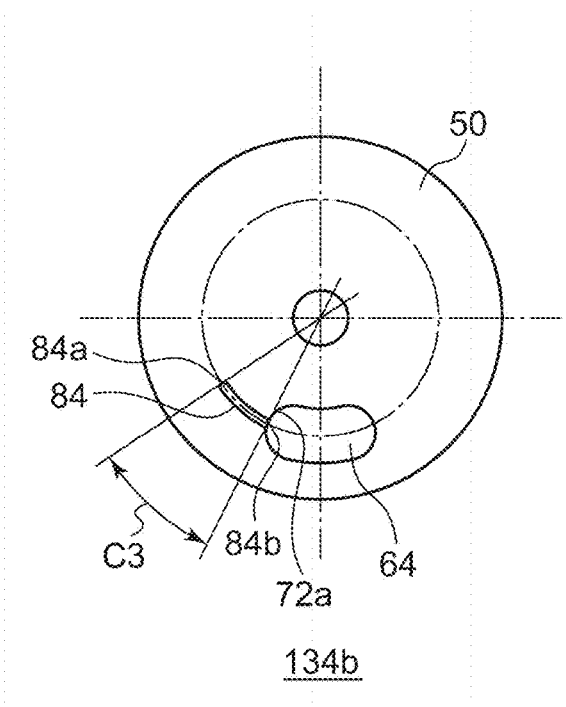

Each of FIGS. 8A and 8B is a plan view schematically showing a valve rotor 134a and a valve stator 134b according to still another embodiment. As shown in FIGS. 8A and 8B, the thin groove preceded in the valve rotation direction may be provided in the valve stator 13b. The valve rotor 134a does not include the thin groove.

The valve stator 134b includes a stator communication path 84 which is open to the stator plane 50 and extends toward the stator recessed portion 64. The stator communication path 84 is formed on the stator plane 50 and is a groove which is slenderer than the stator recessed portion 64. The stator communication path 84 extends in a circular-arc shape along the central radius (that is, the average radius between the stator recessed portion inner edge line 72c and the stator recessed portion outer edge line 72d) of the stator recessed portion 64 indicated by a dashed line in FIG. 8B. The depth of the stator communication path 84 from the stator plane 50 is smaller than the depth of the stator recessed portion 64.

The stator communication path 84 includes a third starting end 84a which is open to the stator plane 50 and a third terminal 84b which communicates with the stator recessed portion 64. The third terminal 84b is positioned on the stator recessed portion front edge line 72a. The stator communication path 84 extends from the third starting end 84a toward the third terminal 84b. An angle C3 from the third starting end 84a to the third terminal 84b is larger than 3° and less than 30°.

The stator communication path 84 is formed in the valve stator 134b such that the rotor recessed portion 68 fluidally communicates with the stator recessed portion 64 at the opening degree which is smaller than the first opening degree at the first phase θ1 of the valve rotation preceding the second phase θ2. In addition, the stator communication path 84 is formed in the valve stator 134b such that the low-pressure gas outflow port 70 fluidally communicates with the stator recessed portion 64 at the opening degree which is smaller than the second opening degree at the fourth phase θ4 of the valve rotation preceding the fifth phase θ5.

In this way, even when the communication path is provided in the valve stator 134b, similarly to the embodiment described with reference to FIGS. 2 to 5, it is possible to decrease the maximum value of the load torque applied to the motor 48a.

Figure 9:
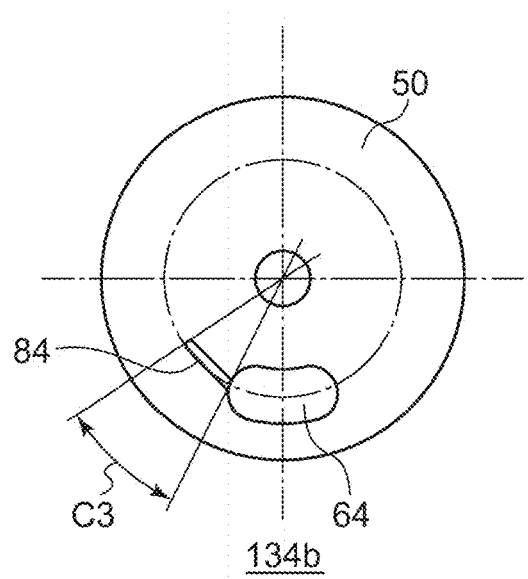
FIG. 9 is a plan view schematically showing the valve stator according to still another embodiment.

FIG. 9 is a plan view schematically showing the valve stator 134b according to still another embodiment. As shown in FIG. 9, the stator communication path 84 may be linear.

Second Embodiment

Figure 10:
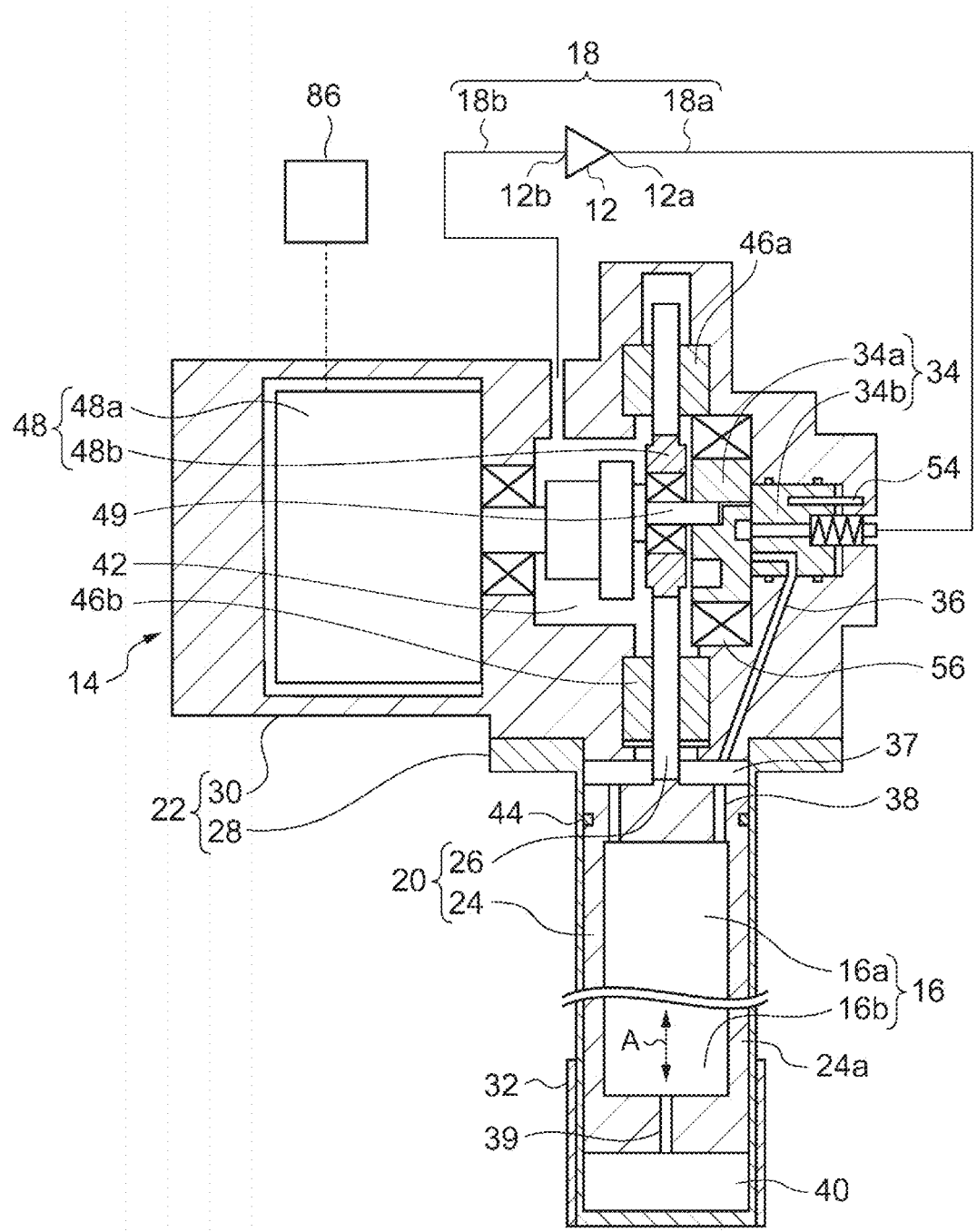
FIG. 10 is a view schematically showing the entire configuration of a cryocooler according to a second embodiment.

FIG. 10 is a view schematically showing the entire configuration of a cryocooler according to a second embodiment. The cryocooler 10 according to the second embodiment is different from the cryocooler 10 according to the first embodiment in that the motor 48a is a reversible motor. Since other features are the same, the cryocooler 10 according to the second embodiment comprises the valve portion 34 as described above with referring to FIG. 2 to FIG. 5. Thus, the valve rotor 34a is provided with the first rotor communication groove 80 and the second rotor communication groove 82.

The motor 48a can rotate the valve rotor 34a not only in the valve rotation direction R as shown in FIG. 2 and FIG. 5, which hereinafter may be referred to as a second direction, but also is the opposite direction, which hereinafter may be referred to as a first direction. By using the rotation in the first direction, the motor 48a rotates the valve rotor 34a about the valve rotation axis Y in the first direction. The motor 48a is capable of rotating in the second direction opposite to the first direction. By using the rotation in the second direction, the motor 48a rotates the valve rotor 34a about the valve rotation axis Y in the second direction. The motor 48a can rotate the valve rotor 34a in the first direction at a constant speed and also rotate the valve rotor 34a in the second direction at the same constant speed. The motor 48a may be configured to rotate the valve rotor 34*a* in the first direction at a first speed and also rotate the valve rotor 34*a* in the second direction at a second speed that is different from the first speed. The second speed is faster than the first speed.

The cryocooler 10 may comprise a motor controller 86 configured to control the rotational direction of the motor 48*a*. The motor controller 86 may be configured to switch the rotational direction of the motor 48*a* in accordance with an input from a user. For example, the motor controller 86 may comprise a switch to be manipulated by the user. When the switch is manipulated, the rotational direction of the motor 48*a* is reversed, i.e., from the first direction to the second direction, or from the second direction to the first direction. The motor controller 86 may be configured to control the rotational speed of the motor 48*a*. For example, the motor controller 86 may rotate the motor 48*a* in the first direction at the first speed and rotate the motor 48*a* in the second direction at the second speed that is different from the first speed. The motor controller 86 may comprise an inverter to control the rotational speed of the motor 48*a*.

Figure 11:
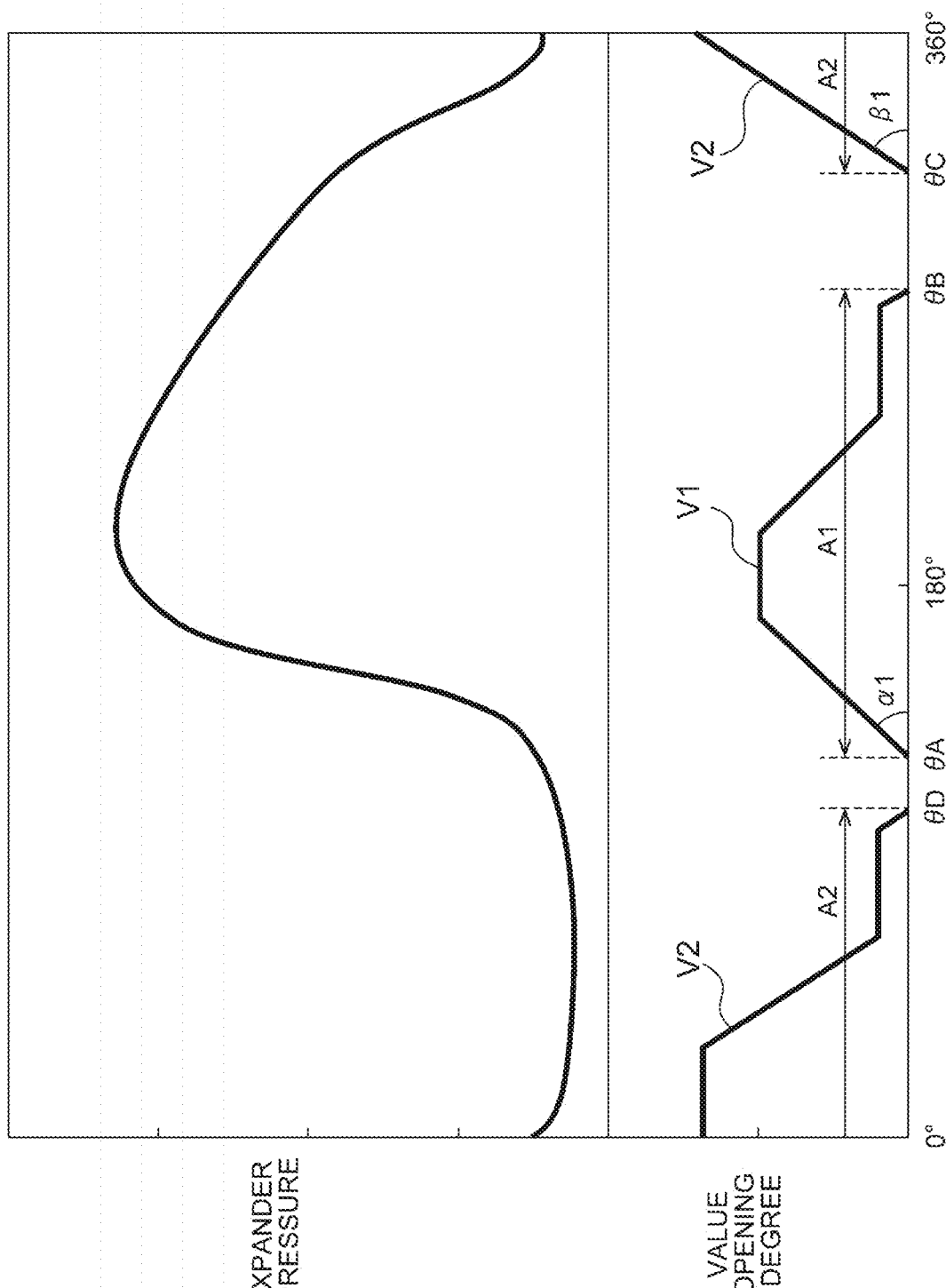
FIG. 11 is a view schematically showing an exemplary valve timing of a cryocooler according to the second embodiment.
Figure 12:
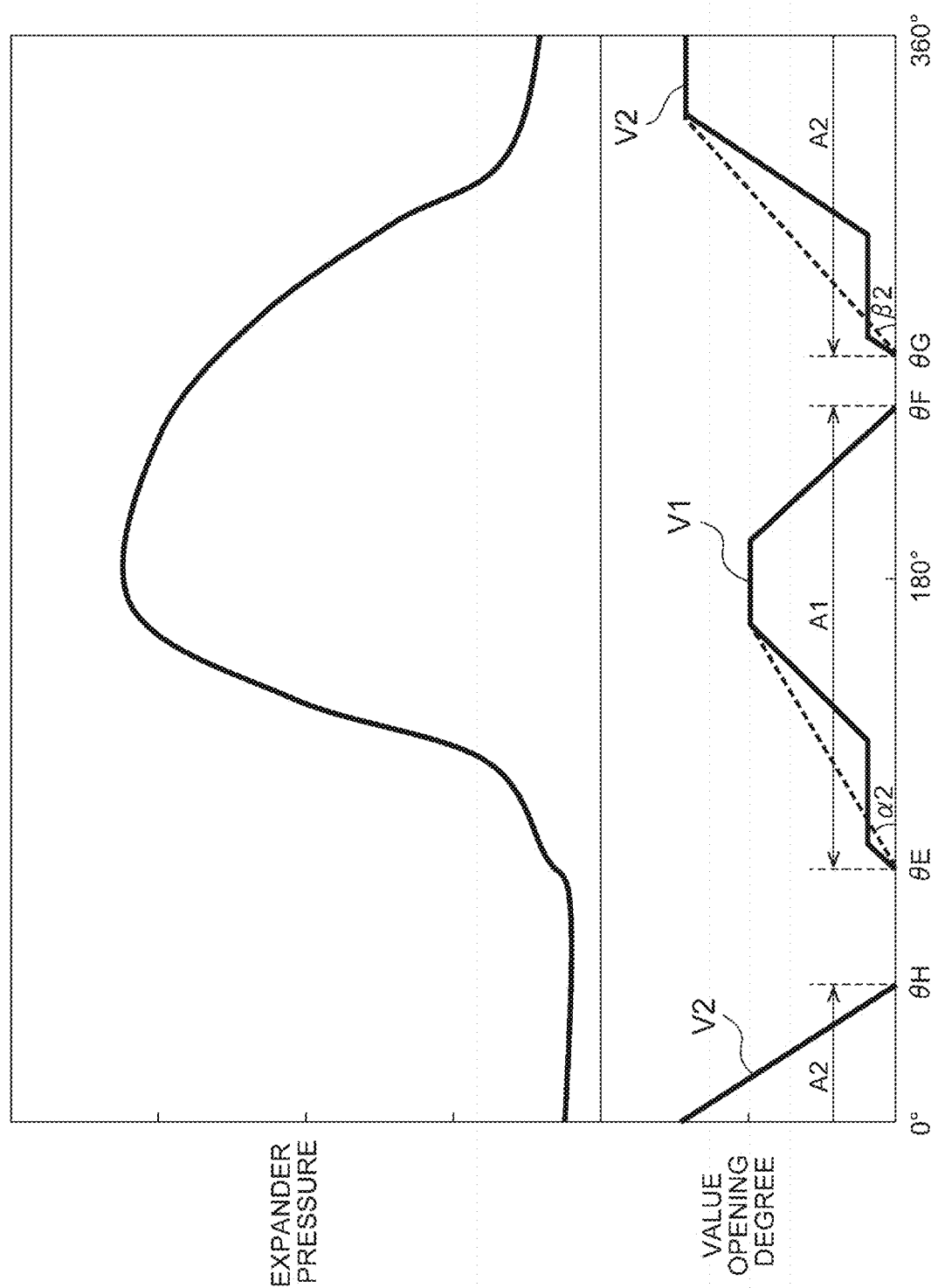
FIG. 12 is a view schematically showing an exemplary valve timing of a cryocooler according to the second embodiment.

FIG. 11 and FIG. 12 are views schematically showing an exemplary valve timing of a cryocooler according to the second embodiment. FIG. 11 shows the change of the opening degree of the intake valve V1 and the exhaust valve V2 when the valve rotor 34*a* rotates in the first direction. FIG. 12 shows the change of the opening degree of the intake valve V1 and the exhaust valve V2 when the valve rotor 34*a* rotates in the second direction. Thus, the valve timing and the operation of the cryocooler 10 in FIG. 12 are the same as those described above with referring to FIG. 4 and FIG. 5. However, in FIG. 11 and FIG. 12, the timing when the displacer 24 is positioned at the top dead center is defined as 0 degrees and the timing when the displacer 24 is positioned at the bottom dead center is defined as 180 degrees, contrary to FIG. 4. The valve timing of FIG. 11 is reversed with respect to the valve timing of FIG. 12. Also, FIG. 11 and FIG. 12 show the pressure change in the gas expansion chamber 40.

In the valve timing as shown in FIG. 11, the intake valve V1 opens when the displacer 24 is at the bottom dead center (the phase 180 degrees) and the vicinity thereof and the gas expansion chamber 40 is pressurized, i.e., the intake process A1 is carried out. The exhaust valve V2 opens when the displacer 24 is at the top dead center (the phase 0 degrees) and the vicinity thereof and the gas expansion chamber 40 is depressurized, i.e., the exhaust process A2 is carried out. By using such valve timing, the cooling cycles are formed within the gas expansion chamber 40 when the valve rotor 34*a* rotates in the first direction, thereby the cryocooler 10 achieves cooling of the cooling stage 32 at a desired temperature.

More specifically, the intake valve V1 opens at the phase θA and closes at the phase θB. The phase θA is prior to 180 degrees, i.e., the bottom dead center, and the phase θB is subsequent to 180 degrees. The exhaust valve V2 opens at the phase θC and closes at the phase θD. The phase θC is prior to 0 degrees, i.e., the top dead center and the phase θD is subsequent to 0 degrees. In the valve timing of FIG. 11, the valve portion 34 rotates in the opposite direction as compared to the valve portion 34 shown in FIG. 5. Therefore, the relative positions of the valve rotor 34*a* and the valve stator 34*b* at the phase θA, the phase θB, the phase θC and the phase θD in FIG. 11 are illustrated as the phase θ3, the phase θ1, the phase θ6 and the phase θ4 in FIG. 5, respectively.

As can be seen in the figures, at the timing of opening of the intake valve V1 (θA of FIG. 11, i.e., θ3 of FIG. 5), the rotor recessed portion rear edge line 74*b* passes the stator recessed portion front edge line 72*a* and thereby the rotor recessed portion 68 is connected to the stator recessed portion 64. The first rotor communication groove 80 does not involve the valve opening speed of the intake valve V1 because it is located at the trailing end of the rotor recessed portion 68 in the first rotational direction.

Subsequently, at the timing of opening of the exhaust valve V2 (θC of FIG. 11, i.e., θ6 of FIG. 5), the outflow port outer edge line 76*d* passes the stator recessed portion rear edge line 72*b* and thereby the low-pressure gas outflow port 70 is connected to the stator recessed portion 64. The second rotor communication groove 82 does not involve the valve opening speed of the exhaust valve V2 because it is located at the trailing end of the low-pressure gas outflow port 70 in the first rotational direction.

The term "valve opening speed" used in this text may be defined as an average rate of change of the opening degree when the opening degree of the valve portion 34 (i.e., the intake valve V1 or the exhaust valve V2) increases from zero to a maximum value. FIG. 11 shows the first valve opening speed α1 of the intake valve V1 and the first valve opening speed β1 of the exhaust valve V2 when the valve rotor 34*a* rotates in the first direction. The first valve opening speed (α1, β1) is relatively large.

In the valve timing as shown in FIG. 12, similarly to FIG. 11, the intake valve V1 opens at the bottom dead center of the displacer 24 and its vicinity so that the intake process A1 is carried out and the exhaust valve V2 opens at the top dead center of the displacer 24 and its vicinity so that the exhaust process is carried out. By using such valve timing, the cooling cycles are formed within the gas expansion chamber 40 when the valve rotor 34*a* rotates in the second direction, thereby the cryocooler 10 achieves cooling of the cooling stage 32 at a desired temperature.

The intake valve V1 opens at the phase θE and closes at the phase θF. The exhaust valve V2 opens at the phase θC and closes at the phase θD. In the valve timing of FIG. 12, the valve portion 34 rotates in the same direction as the valve portion 34 shown in FIG. 5. Therefore, the relative positions of the valve rotor 34*a* and the valve stator 34*b* at the phase θE, the phase θF, the phase θG and the phase θH are illustrated as the phase θ1, the phase θ3, the phase θ4 and the phase θ6 of FIG. 5, respectively.

At the timing of opening of the intake valve V1 (θE of FIG. 12, i.e., θ1 of FIG. 5), the first starting end 80*a* of the first rotor communication groove 80 passes the stator recessed portion front edge line 72*a* and thereby the rotor recessed portion 68 is connected to the stator recessed portion 64 through the first rotor communication groove 80. At the timing of opening of the exhaust valve V2 (θG of FIG. 12, i.e., θ4 of FIG. 5), the second starting end 82*a* of the second rotor communication groove 82 passes the stator recessed portion front edge line 72*a* and thereby the low-pressure gas outflow port 70 is connected to the stator recessed portion 64 through the second rotor communication groove 82.

FIG. 12 shows the second valve opening speed α2 of the intake valve V1 and the second valve opening speed β2 of the exhaust valve V2 when the valve rotor 34*a* rotates in the second direction. The second valve opening speed (α2, β2) is relatively small because the first rotor communication groove 80 and the second rotor communication groove 82 are provided. The second valve opening speed α2 of the intake valve V1 is smaller than the first valve opening speed α1 of the intake valve V1. The second valve opening speed β2 of the exhaust valve V2 is smaller than the first valve opening speed β1 of the exhaust valve V2.

Accordingly, the valve rotor 34a is configured such that the first valve opening speed (α1, β1) when the motor 48a rotates in the first direction is different from the second valve opening speed (α2, β2) when the motor 48a rotates in the second direction.

Since the motor 48a is a reversible motor, an operator can select either the first rotational direction or the second rotational direction to operate the cryocooler 10. The rotation in the first direction may be referred to as a first cooling operation mode of the cryocooler 10 and the rotation of the second direction may be referred to as a second cooling operation mode of the cryocooler 10. The cryocooler 10 according to the second embodiment is capable of switching between the first cooling operation mode and the second cooling operation mode depending on the circumstances.

The first cooling operation mode allows rapid change of the pressure within the gas expansion chamber 40 as compared to the second cooling operation mode. The first cooling operation mode is advantageous for improving the refrigeration capacity of the cryocooler 10 because the cooling cycle can generate a greater amount of the PV (pressure-volume) work. The first rotational direction is selected and the cryocooler 10 is operated in the first cooling operation mode in the circumstances where the cryocooler 10 should provide a greater refrigeration capacity, for example, when rapid cooling is required from a room temperature to a cryogenic temperature or when an object to be cooled receives a large amount of input heat.

The second cooling operation mode can prevent an abrupt change of pressure within the gas expansion chamber 40 as compared to the first cooling operation mode. When the intake valve V1 (or the exhaust valve V2) opens, the valve portion 34 may suffer noise due to a gas flow from the high-pressure side to the low-pressure side. The abrupt change of pressure may make the noise louder. Therefore, the second cooling operation mode is advantageous to reduce such a noise. The second rotational direction is selected and the cryocooler 10 is operated in the second cooling operation mode in the circumstances where it is desirable that the operation noise of the cryocooler 10 is reduced. The cryocooler 10 may be operated quietly.

The rotational speed of the motor 48a, i.e., the rotational speed of the valve portion 34, in the second cooling operation mode may be greater than that in the first cooling operation mode. This can increase the refrigeration capacity in the second cooling operation mode.

Accordingly, the cryocooler 10 according to the second embodiment can provide switching between the first cooling operation mode and the second cooling operation mode depending on the circumstances.

Although specific reference has been made to the valve rotor 34a that is provided with the first rotor communication groove 80 and the second rotor communication groove 82, alternative arrangements may be possible in the second embodiment. As shown in FIG. 8A and FIG. 8B, the valve stator 134b may comprise the stator communication path 84. The valve rotor 134a does not comprise the first rotor communication groove 80 and the second rotor communication groove 82. Accordingly, the valve stator 134b may be configured such that the first valve opening speed when the motor 48a rotates in the first direction is different from the second valve opening speed when the motor 48a rotates in the second direction.

In the above-described embodiments, the phase difference of the rotations of the motor 48a and the valve portion 34 is the same in both of the first cooling operation mode and the second cooling operation mode. However, the cryocooler 10 may be configured to change the phase difference Δθ of the rotations of the motor 48a and the valve portion 34 between the first cooling operation mode and the second cooling operation mode in order to adjust (e.g., optimize) the refrigeration capacity of the first cooling operation mode and/or the second cooling operation mode.

Figure 13:
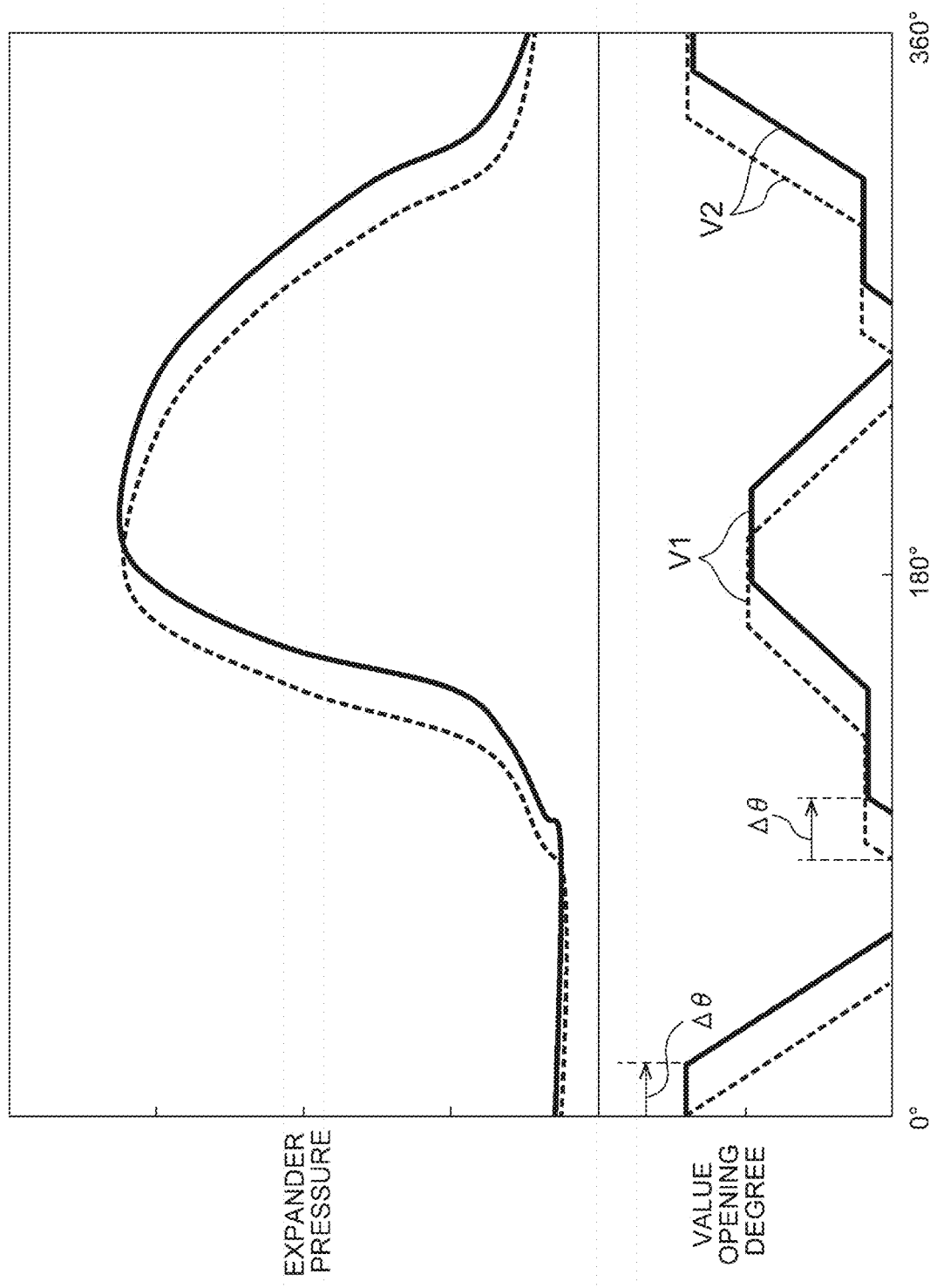
FIG. 13 is a view schematically showing another exemplary valve timing that may be used in a cryocooler according to the second embodiment.

FIG. 13 is a view schematically showing another exemplary valve timing that may be used in the second operation mode of the cryocooler 10 according to the second embodiment. In FIG. 13, the valve timing and the pressure change of the second cooling operation mode as shown in FIG. 12 are illustrated in dotted lines for the purpose of comparison. The valve timing of FIG. 13 has a phase difference Δθ with respect to the valve timing of FIG. 12. The phase difference Δθ may be within 90 degrees to ensure generation of the cooling cycles both in the first cooling operation mode and the second cooling operation mode. The pressure change within the gas expansion chamber 40 due to the valve timing of FIG. 13 is illustrated in solid line.

Figure 14:
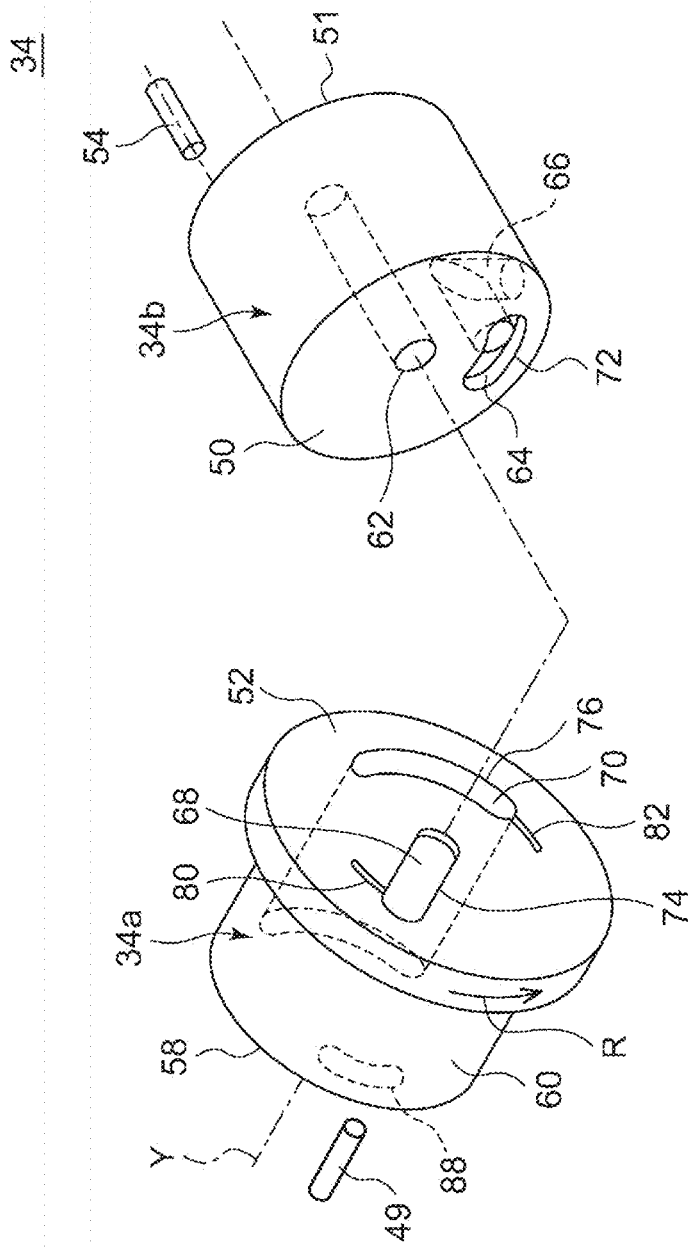
FIG. 14 is an exploded perspective view schematically showing a valve portion that may be used in a cryocooler according to the second embodiment.

FIG. 14 is an exploded perspective view schematically showing the valve portion 34 that may be used in the cryocooler 10 according to the second embodiment. The valve portion 34 shown in FIG. 14 is capable of changing the phase difference between the rotation of the motor 48a and the rotation of the valve portion 34 during the first cooling operation mode which is different from the phase difference during the second cooling operation mode. The valve portion 34 may be operated with the valve timing of FIG. 11 during the first cooling operation mode and may be operated with the valve timing of FIG. 13 during the second cooling operation mode, for example.

The valve rotor end surface 58 is provided with an engagement groove 88 of an arc shape for engagement with the crank pin 49. The engagement groove 88 is centered with the valve rotation axis Y. The center angle of the engagement groove 88 corresponds to the phase difference Δθ described above. When the motor 48a rotates in the first direction, the crank pin 49 engages with one end of the engagement groove 88 so that the valve rotor 34a rotates in the first direction with the rotation of the motor 48a. When the rotation of the motor 48a is reversed from the first direction to the second direction, the crank pin 49 moves from said one end to the other end of the engagement groove 88. During the movement of the crank pin 49, the valve rotor 34a is stationary without rotated. The crank pin 49 reaches the other end of engagement groove 88 and then the crank pin 49 engages with the engagement groove 88 so that the rotation of the valve rotor 34a in the second direction starts. In this way, the phase difference between the rotations of the motor 48a and the valve portion 34 is changed when the rotational direction of the motor 48a is changed. As described above, the rotation of the motor 48a makes reciprocation of the displacer 24. Therefore, the phase difference between the reciprocation of the displacer 24 and the rotation of the valve portion 34 is changed.

Hereinbefore, embodiments of the present invention are described. It should be understood that the invention is not limited to the above-described embodiments, but may be modified into various forms on the basis of the spirit of the invention. Additionally, the modifications are included in the scope of the invention.

The shape of the communication path may be variously changed. The terminal of the communication path is limited to the front edge line of the recessed portion and may be positioned on other positions of the recessed portion outline. The starting end of the communication path may be positioned at any position as long as it precedes and opens the valve. The shape of the communication path is not limited to the arc shape or the linear shape, and may be other shapes such as a curved shape or a folded-line shape.

The communication path may not be along the rotor plane (or stator plane). The communication path may pass through the inside of the valve rotor or the valve stator. The starting end of the communication path may be positioned on the plane and the terminal thereof may be positioned outside the plane.

In an embodiment, the rotor communication path and the stator communication path may be provided in the valve portion. The rotor communication path and the stator communication path may communicate with each other at the first phase.

In an embodiment, a second stator communication path may be provided in the high-pressure gas inflow port 62 serving as a second stator recessed portion.

In addition, the configuration of the flow path in the valve portion may be variously changed. In the above-described embodiments, the rotor recessed portion 68 does not penetrate the valve rotor 34a and has a bottom surface in the valve rotor 34a. However, instead of this, the rotor recessed portion may be a through hole which penetrates the valve rotor. Similarly, the stator recessed portion may be a through hole which penetrates the valve stator. The high-pressure gas inflow port does not penetrate the valve stator and may have a bottom surface in the valve stator. The low-pressure gas outflow port does not penetrate the valve rotor and may have a bottom surface in the valve rotor. The high-pressure gas inflow port may be formed in the valve rotor. The low-pressure gas outflow port may be formed in the valve stator.

In the above-described embodiments, the embodiments are described in which the cryocooler is a single-stage GM cryocooler. However, the present invention is not limited to this, and the valve configurations according to the embodiments can be applied to a two-stage or a multiple-stage GM cryocooler, or can be applied to other cryocoolers such as a pulse tube cryocooler.

What is claimed is:

1. A cryocooler comprising:
   a motor;
   a displacer which is engaged to the motor so as to be reciprocated by the motor;
   an expander airtight container in which the displacer is accommodated and a gas expansion chamber is formed between the displacer and the expander airtight container, wherein the expander airtight container includes a low-pressure gas chamber which communicates with a compressor intake port;
   a valve stator which includes a stator plane perpendicular to a valve rotation axis, a high-pressure gas inflow port which is open to the stator plane and communicates with a compressor discharge port, and a stator recessed portion which is open to the stator plane and communicates with the gas expansion chamber, wherein the valve stator is disposed in the low-pressure gas chamber; and
   a valve rotor which includes a rotor plane which is perpendicular to the valve rotation axis and is in surface-contact with the stator plane, a rotor recessed portion which is open to the rotor plane and communicates with the high-pressure gas inflow port, and a first rotor communication path which is open to the rotor plane and extends toward the rotor recessed portion, wherein the valve rotor is disposed in the low-pressure gas chamber so as to rotate around the valve rotation axis with respect to the valve stator;
   wherein the rotor recessed portion is formed in the valve rotor such that the rotor recessed portion fluidally communicates with the stator recessed portion at a first opening degree at a second phase of a valve rotation and the rotor recessed portion is fluidally separated from the stator recessed portion at a third phase of the valve rotation following the second phase, and
   wherein the first rotor communication path is formed in the valve rotor such that the rotor recessed portion fluidally communicates with the stator recessed portion at an opening degree which is smaller than the first opening degree at a first phase of the valve rotation preceding the second phase.

2. The cryocooler according to claim 1, wherein the stator recessed portion defines an outline of the stator recessed portion on the stator plane, and
   wherein the first rotor communication path includes a first rotor communication groove which includes a first starting end which is open to the rotor plane and is formed on the rotor plane from the first starting end to the rotor recessed portion, in which the first starting end is positioned on the rotor plane so as to pass through the outline of the stator recessed portion at the first phase.

3. The cryocooler according to claim 1, wherein a phase difference between the first phase and the second phase is larger than 3° and less than 30°.

4. The cryocooler according to claim 1, wherein the valve rotor includes a low-pressure gas outflow port which is open to the rotor plane and communicates with the low-pressure gas chamber and a second rotor communication path which is open to the rotor plane and extends toward the low-pressure gas outflow port,
   wherein the low-pressure gas outflow port is formed in the valve rotor such that the low-pressure gas outflow port fluidally communicates with the stator recessed portion at a second opening degree at a fifth phase of the valve rotation and the low-pressure gas outflow port is fluidally separated from the stator recessed portion at a sixth phase of the valve rotation following the fifth phase, and
   wherein the second rotor communication path is formed in the valve rotor such that the low-pressure gas outflow port fluidally communicates with the stator recessed portion at an opening degree which is smaller than the second opening degree at a fourth phase of the valve rotation following the third phase and preceding the fifth phase.

5. A cryocooler comprising:
   a motor;
   a displacer which is engaged to the motor so as to be reciprocated by the motor;
   an expander airtight container in which the displacer is accommodated and a gas expansion chamber is formed between the displacer and the expander airtight container, wherein the expander airtight container includes a low-pressure gas chamber which communicates with a compressor intake port;
   a valve stator which includes a stator plane perpendicular to a valve rotation axis, a high-pressure gas inflow port which is open to the stator plane and communicates with the compressor discharge port, a stator recessed portion which is open to the stator plane and communicates with the gas expansion chamber, and a stator communication path which is open to the stator plane and extends toward the stator recessed portion, wherein the valve stator is disposed in the low-pressure gas chamber; and a valve rotor which includes a rotor plane which is perpendicular to the valve rotation axis and is in surface-contact with the stator plane, and a rotor recessed portion which is open to the rotor plane and communicates with the high-pressure gas inflow port, wherein the valve rotor is disposed in the low-pressure gas chamber so as to rotate around the valve rotation axis with respect to the valve stator;

wherein the rotor recessed portion is formed in the valve rotor such that the rotor recessed portion fluidally communicates with the stator recessed portion at a first opening degree at a second phase of a valve rotation, and wherein the stator communication path is formed in the valve stator such that the rotor recessed portion fluidally communicates with the stator recessed portion at an opening degree which is smaller than the first opening degree at a first phase of the valve rotation preceding the second phase.

6. A rotary valve mechanism of a cryocooler, the mechanism comprising:

a valve stator which includes a stator plane perpendicular to a valve rotation axis and a stator recessed portion which is open to the stator plane and is a portion of a working gas flow path of a cryocooler; and a valve rotor which includes a rotor plane which is perpendicular to the valve rotation axis and is in surface-contact with the stator plane, and a rotor recessed portion which is open to the rotor plane and is a portion of the working gas flow path of the cryocooler, wherein the valve rotor is disposed so as to rotate around the valve rotation axis with respect to the valve stator, wherein the rotor recessed portion is formed in the valve rotor such that the rotor recessed portion fluidally communicates with the stator recessed portion at a first opening degree at a second phase of a valve rotation, wherein the valve rotor includes a rotor communication path which is formed in the valve rotor such that the rotor recessed portion fluidally communicates with the stator recessed portion at an opening degree which is smaller than the first opening degree at a first phase of the valve rotation preceding the second phase, and/or wherein the valve stator includes a stator communication path which is formed in the valve stator such that the rotor recessed portion fluidally communicates with the stator recessed portion at an opening degree which is smaller than the first opening degree at the first phase of the valve rotation preceding the second phase.

7. A cryocooler comprising the rotary valve mechanism according to claim 6.

8. The cryocooler according to claim 1, wherein the motor is a reversible motor connected to the valve rotor to rotate the valve rotor around the valve rotation axis with respect to the valve stator; and wherein the valve rotor is configured such that a first valve opening speed when the reversible motor rotates in a first direction is different from a second valve opening speed when the reversible motor rotates in a second direction that is opposite to the first direction.

9. The cryocooler according to claim 5, wherein the motor is a reversible motor connected to the valve rotor to rotate the valve rotor around the valve rotation axis with respect to the valve stator; and wherein the valve stator is configured such that a first valve opening speed when the reversible motor rotates in a first direction is different from a second valve opening speed when the reversible motor rotates in a second direction that is opposite to the first direction.

10. The rotary valve mechanism according to claim 6, further comprising a reversible motor connected to the valve rotor to rotate the valve rotor around the valve rotation axis with respect to the valve stator, wherein the rotary valve mechanism is configured such that a first valve opening speed when the reversible motor rotates in a first direction is different from a second valve opening speed when the reversible motor rotates in a second direction that is opposite to the first direction.

\* \* \* \* \*